(12) United States Patent
Avvari et al.

(10) Patent No.: US 7,114,159 B2
(45) Date of Patent: *Sep. 26, 2006

(54) PROCESSING RESOURCE FOR USE IN A DISTRIBUTED PROCESSING FRAMEWORK SYSTEM AND METHODS FOR IMPLEMENTING THE SAME

(75) Inventors: Madhava V. Avvari, Cupertino, CA (US); Satya N. Dodda, San Jose, CA (US); David S. Herron, Fremont, CA (US); Bae-Chul Kim, San Jose, CA (US); Gabriel R. Reynaga, Cupertino, CA (US); Konstantin I. Boudnik, Santa Clara, CA (US); Narendra Patil, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 09/967,699

(22) Filed: Sep. 28, 2001

(65) Prior Publication Data

US 2003/0120825 A1 Jun. 26, 2003

Related U.S. Application Data

(60) Provisional application No. 60/304,919, filed on Jul. 11, 2001.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................. 719/31 D; 719/330

(58) Field of Classification Search ........ 719/310–320, 719/328–330; 718/100–108; 717/124–135; 709/201–206, 217–219, 224–226
See application file for complete search history.

(56) References Cited

U.S. PATENT DOCUMENTS

| | | | |
|---|---|---|---|
| 5,371,883 A | 12/1994 | Gross et al. | 714/38 |
| 5,524,253 A | 6/1996 | Pham et al. | 709/202 |
| 5,742,754 A | 4/1998 | Tse | 395/183.14 |
| 5,854,889 A | 12/1998 | Liese et al. | 714/43 |
| 5,896,495 A | 4/1999 | Stein et al. | 714/38 |
| 5,925,102 A | 7/1999 | Eilert et al. | 709/226 |
| 5,948,065 A | 9/1999 | Eilert et al. | 709/226 |
| 6,058,393 A * | 5/2000 | Meier et al. | 707/10 |

(Continued)

FOREIGN PATENT DOCUMENTS

EP  0 892 530 A  1/1999

OTHER PUBLICATIONS

Arnold, The Jini Architecture: Dynamic Services in a Flexible Network, ACM, 1999, pp. 1-6.*

(Continued)

*Primary Examiner*—William Thomson
*Assistant Examiner*—Diem Cao
(74) *Attorney, Agent, or Firm*—Martine Penilla & Gencarella, LLP

(57) ABSTRACT

A method for executing a process by a processing resource is provided. The method includes enabling the processing resource and advertising an availability of the processing resource to execute a job. Also included is receiving a request to execute the job on the processing resource. The method further includes launching a process service to execute the job, executing the job, and completing the execution of the job.

16 Claims, 14 Drawing Sheets

U.S. PATENT DOCUMENTS

| | | | |
|---|---|---|---|
| 6,112,243 A * | 8/2000 | Downs et al. | 709/226 |
| 6,216,158 B1 * | 4/2001 | Luo et al. | 709/217 |
| 6,360,268 B1 | 3/2002 | Silva et al. | 709/227 |
| 6,574,628 B1 | 6/2003 | Kahn et al. | 707/10 |
| 6,662,217 B1 * | 12/2003 | Godfrey et al. | 709/219 |
| 6,697,967 B1 | 2/2004 | Robertson | 714/43 |
| 6,708,324 B1 | 3/2004 | Solloway et al. | 717/124 |
| 6,754,701 B1 | 6/2004 | Kessner | 709/219 |
| 6,757,262 B1 * | 6/2004 | Weisshaar et al. | 370/310 |

OTHER PUBLICATIONS

Sommers, Activatable Jini services: Implement RMI activation, IBM, Oct. 24, 2000, pp. 1-12.*

Edwards, W. K., "Core JINI", *Prentice Hall Ptr.*, Indianapolis, US, Jun. 1999, pp. 64-83, XP002265323.

Edwards, W. K., "Core JINI", *Prentice Hall Ptr.*, Indianapolis, US, Jun. 1999, pp. 297, 305-320, 329, XP002212134.

Pagurek, B., et al., "Management of Advanced Services in H.323 Internet Protocol Telephony", *Proceedings IEEE Infocom 2000. The Conference on Computer Communications. 19th Annual Joint Conference of the IEEE Computer and Communications Societies.* Tel Aviv, Israel, Mar. 2000, Proceedings IEEE Infocom. The Conference on computer Communications, vol. 3 of 3, Conf. Mar. 2000, pp. 91-100, XP001004237, ISBN: 0-7803-5881-3, pp. 92 and 94.

Paulson, D., "JIVI Project: JINI-Based Intranet Virtual Instruments", *JIVI Project Information*, May 2000, pp. 1-3, XP002302376, http://jivi.jini.org.

Edwards, W. K., "Core JINI", *Prentice Hall Ptr.*, Indianapolis, US, Jun. 1999, pp. 136-163, XP002302486.

Sun Microsystems: "Jini™ Device Architecture Specification" Sun Community Resources, 'Online! Jan. 25, 1999, XP002265322, retrieved from the Internet: <URL:http://wwws.sun.com/software/jini/specs/jini101specs/jini-spec.html>, retrieved on Dec. 16, 2003, paragraphs 01-01.1, and paragraphs 02.1-02.4.

Sun Microsystems: "Jini™ Architectural Overview", Sun Technical Whitepapers, 'Online! Jan. 1999, XP002266391, Retrieved from the Internet: <URL:http://wwws.sun.com/software/jini/whitepapers/architecture.html>, retrieved on Jan. 7, 2004, paragraphs 0001-0002.

U.S. Appl. No. 09/953,223, filed on Sep. 11, 2001, entitled "Distributed Processing Framework System".

U.S. Appl. No. 09/967,646, filed on Sep. 28, 2001, entitled "System Controller for use in a Distributed Processing Framework System and Methods for Implementing the Same"; and.

U.S. Appl. No. 09/967,630, filed on Sep. 28, 2001, entitled "Registry Service for use in a Distributed Processing Framework System and Methods for Implementing the Same".

* cited by examiner

PROCESSING RESOURCE FOR USE IN A DISTRIBUTED PROCESSING FRAMEWORK SYSTEM AND METHODS FOR IMPLEMENTING THE SAME

CROSS REFERENCE TO RELATED APPLICATIONS

This application claims priority from U.S. Provisional Patent Application No. 60/304,919 filed on Jul. 11, 2001 and entitled "Distributed Test Framework," which is incorporated herein by reference in its entirety.

BACKGROUND OF THE INVENTION

1. Field of the Invention

The present invention relates generally to software processing, and more particularly, to methods and systems capable of dynamically availing respective unused resources to processing computing operations.

2. Description of the Related Art

As the use of software in performing daily tasks is increasing rapidly, assessing software reliability through software testing has become an imperative stage in software development cycle. As is well known, software testing is used to find and eliminate defects (i.e., bugs) in software, which if undetected, can cause the software to operate improperly. In general, software testing may be performed by implementing a stand-alone computer or a network of computer resources. When a stand-alone computer system is used to perform the software testing, the stand-alone computer system is programmed to run a test selected by the software user. Comparatively, if a network of computer resources is used, the user is responsible for manually adding and deleting the computer resources to the network, programming the master computer system and the server, initiating the running of a user-selected test, and running the test on the group of dedicated computer systems coupled to the server.

In either scenario, a heavy user interface is required for initiating the software testing on the master computer, scheduling the running of the specific test on the system resources, adding and deleting of the system resources, keeping track of the system resources and their respective hardware and software configuration, and maintaining the system resources. Additionally, in either case, the software testing is performed by dedicated system resources. That is, the system resources are designed to solely be used for software testing.

At least two drawbacks can be associated with the current state of software testing described above. First, the significant role of human interaction causes software testing to be very time consuming and costly. In certain situations, this setback is extrapolated as a result of human error. Second, currently, computer resources are being wasted, as the computer resources are solely dedicated to software testing.

In view of the foregoing, there is a need for methodology and systems capable of freely and dynamically availing respective unused resources to processing a computer software.

SUMMARY OF THE INVENTION

Broadly speaking, the present invention fills these needs by providing a processing resource for use in a distributed processing framework system and methods for implementing the same. The processing resource of the present invention is an undedicated and free processing resource configured to dynamically avail its untapped resources to executing a suitable process. In one embodiment, the processing resources of the present invention are implemented in a distributed processing framework (DPF) system configured to manage the execution of processes by a plurality of ad-hoc, undedicated, and cross-platform distributed processing resources. In one embodiment, the processing resources of the present invention are implemented in a distributed test framework (DTF) system designed to manage software test suite execution on cross-platform dynamically networked distributed processing resources. It should be appreciated that the present invention can be implemented in numerous ways, including as a process, an apparatus, a system, a device, or a method. Several inventive embodiments of the present invention are described below.

In one embodiment, a processing resource is disclosed. The processing resource includes a machine service component configured to have a machine service proxy and a set of machine service attributes. The machine service is designed to implement the machine service proxy and the set of machine service attributes to register the processing resource with a registry service. By registering with the registry service, the processing resource advertises the availability of the processing resource to execute a process. The machine service proxy is implemented by a system controller to communicate with the processing resource.

In another embodiment, a method for executing a process by a processing resource is disclosed. The method includes enabling the processing resource and advertising an availability of the processing resource to execute a job. Also included in the method is receiving a request to execute the job on the processing resource. The method further includes launching a process service to execute the job, executing the job, and completing the execution of the job.

In yet another embodiment, a process execution method is disclosed. The method includes starting a processing resource and launching a machine service on the processing resource. Also included is registering a machine service proxy and a set of machine service attributes with a registry service. The method further includes receiving a request to execute a process having a set of requirements. The set of requirements of the request is configured to substantially match the set of machine service attributes. Further included in the method is spawning a process service having a process service proxy and a set of process service attributes. A type of the process service is configured to substantially match a type of the process. The method also includes registering the process service proxy and the set of process service attributes with the registry service and executing the process. Further included are sending an event indicating the beginning of the execution of the process and terminating a process service lease with the registry service upon a conclusion of executing the process.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
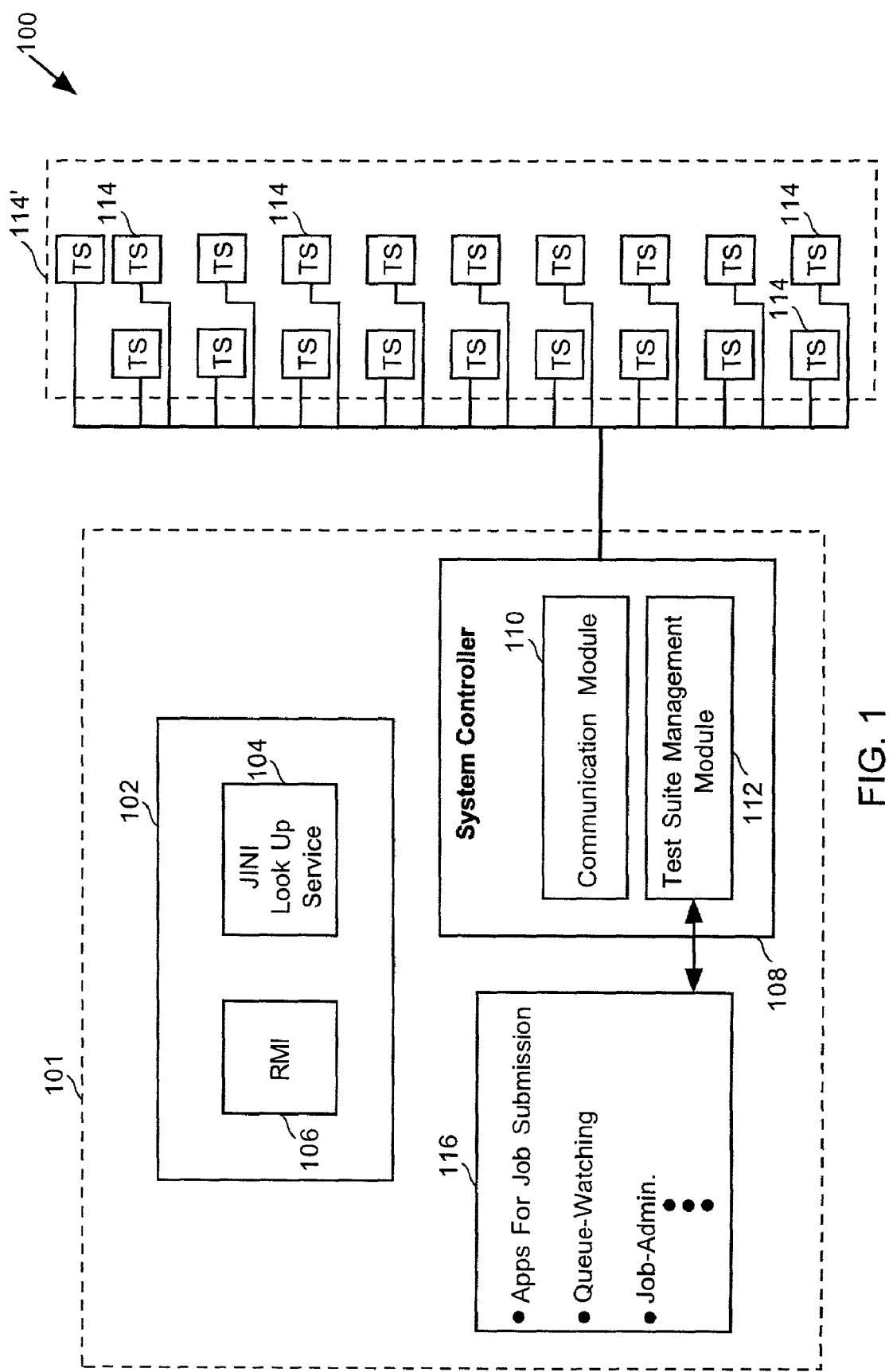
FIG. 1 is a block diagram illustrating a distributed test framework (DTF) system, in accordance with one embodiment of the present invention.

Inventions for a processing resource and methods for implementing the same are disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the present invention relates to creating a dynamic and undedicated processing resource capable of freely availing its untapped resources to execution of a process. In one exemplary embodiment, the ad-hoc, cross platform, and dynamic processing resources of the present invention are used in a distributed processing framework (DPF) system designed to manage the execution of the process by the processing resources. In exemplary embodiments, the processing resources of the present invention are configured to include an agent process having a machine service designed to include a proxy and a set of attributes.

As designed, in one embodiment, the DPF system is configured to intelligently select and utilize the ad-hoc network of undedicated processing resources of the present invention having either the same or different software/ hardware configuration to execute a process. As used herein, an "ad-hoc" or a "dynamic" processing resource of a network is defined as a processing resource configured to be a part of the network temporarily and for a specific length of time (i.e., spontaneous). In one example, the DPF system utilizes a device registry implementing the Jini™ (hereinafter "Jini") technology to provide spontaneous interaction between its components. In this manner, the processing resources of the present invention can freely attach to and detach from the ad-hoc network of computer resources without disturbing the DPF system. Accordingly, the processing resources of the present invention are not solely limited to executing processes submitted to the DPF system.

In one exemplary embodiment, the processing resources of the present invention are implemented in a distributed test framework (DTF) system configured to manage test suite execution on the cross-platform and dynamically networked processing resources (e.g., test systems). In one implementation, the DTF system includes a server computer system and a plurality of ad-hoc network of resources configured to spontaneously interact implementing the Jini technology. The server computer system is configured to include a registry service (e.g. Jini look up service) and a system controller configured to manage the processing of the submitted test suites. In one instance, the plurality of test systems of the present invention join the Jini look up service by registering their respective proxies and corresponding attributes. In one example, the system controller searches the look up service for an available and suitable test system to process each of the submitted test suites. Once a test system is selected to run the test suite, the machine service component of the selected computer resource spawns a second service (e.g., test service) to execute the test suite.

For ease of understanding, a detailed description of the Distributed Processing Framework System will be provided in Section I, and a detailed description of the processing resources for use in a Distributed Processing Framework System will be provided in Section II.

I. Distributed Processing Framework System

As one embodiment of the present invention implements the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping these brief overviews to Jini and Java as they relate to the present invention in mind, reference is now made to FIG. 1 illustrating a block diagram of a distributed test framework (DTF) system 100, in accordance with one embodiment of the present invention. As shown, physically, the DTF system 100 includes two groups of computer systems: (1) a system server group 101, and (2) a test system group 114'. The system server group 101 includes a service component 102 and a system controller 108. The service component 102 is configured to contain a Jini look up service 104 and a Remote Method Invocation (RMI) 106. In one embodiment, the RMI is designed to handle various communication needs. Comparatively, the Jini look up service 104 is a dedicated process running on the master computer system, server, and is configured to function as a central registry. As used herein, the master computer system is defined as the computer system running the system controller 108. As designed, in one embodiment, the master computer is configured to include both the system controller 108 and the service component 102. However, in a different implementation, each of the system controller 108 and the service component 102 may be included and run by separate computer systems. Thus, the look up service 104 enables the system controller 108 to locate available computer systems of an ad-hoc network of computer systems to execute a given test execution request using the test system registerable attributes. For instance, the look up service 104 includes registerable attributes, which identify the test machine platform, operating system, and other software and hardware characteristics.

The illustrated system controller 108 includes a communication module 110 and a test suite management module 112. The communication module 110 manages the communication between the system controller 108 and the distributed test systems 114. For instance, the communication module 110 is responsible for locating available test systems 114, running test execution requests, and gathering information regarding the status of the test systems 114. In one example, the system controller 108 manages the communication with the distributed test systems 114 by implementing a plurality of threads. In this manner, the system controller 108 has the capability to communicate with a plurality of test systems 114 in parallel. However, it must be noted that in a different embodiment, the system controller 108 may implement any suitable mechanism to manage the communication between the system controller 108 and the distributed test systems 114 (e.g., Jini, RMI, TCP/IP Sockets, etc.).

The test suite management module 112 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into a plurality of test execution requests (i.e., jobs).

By way of example, the test suite management module 112 maintains an inqueue directory designed to include almost all the submitted test execution requests. Once the system controller 108 is initiated, the system controller 108 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 112 is configured to manage the software applications and user interfaces implemented for job submission, queue watching, job administration, etc., as shown in 116.

The test system group 114' includes a plurality of test systems 114 having similar or diverse hardware and software configuration. Although shown as a group, the test systems 114 are not necessarily limited to testing. In fact, the test systems 114 can be computers or systems used by employees of a company for normal desktop work. So long as the test systems 114 are associated with the networked group, the processing power of these test systems 114 can be used. In one embodiment, the test systems 114 can be used during normal working ours when the test systems 114 are running, for example, business applications, or during off hours, thus tapping into potentially huge processing resources that would otherwise be left unused. It should therefore be appreciated that test systems 114 do not necessarily have to be solely dedicated to testing or processing for the system server group 101.

In one embodiment, the test systems 114 are configured to execute the test execution requests dispatched by the system controller 108. Each of the test systems 114 runs an agent process (not shown in this Figure) designed to register the respective test system 114 with the Jini look up service 104. In this manner, the agent process for each test system 114 advertises the availability of the associated test system 114. As will be discussed in further detail below, a machine service component of the agent is used to establish communication between the associated test system 114 and the system controller 108. Specifically, by implementing the Jini attributes, the machine service registers the test system 114 characteristics with the Jini look up service 104. The test system 114 attributes are subsequently used by the system controller 108 to locate a test system 114 suitable to execute a specific test execution request.

While the DTF system 100 can physically be divided into two groups, logically, the DTF system 100 is comprised of three over all parts: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queue, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Finds substantially all the processes, and once found kills each of the processes, individually.

Submit jobs: Before the system controller 108 is launched, an Extensible Markup Language (XML) formatted test-execution-request file is created in the inqueue directory (e.g., that is preferably part of the test suite management module). In this manner, once the system Controller 108 is launched, the system controller 108 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 108 is configured to implement various input files.

The second logical component, the test scheduler and system controller, includes the system controller 108 configured to perform the function of managing the job queues and dispatching the test execution requests to test system 114 for processing. Thus, the system controller 108 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 108 by implementing a plurality of log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 114 having the required characteristics is available to execute the job.

In accordance with one implementation, the requirements for a DTF system are provided below in Table 1.

TABLE 1

Client-Server Test Frame Requirements

| Requirements | | Accessments | Notes |
|---|---|---|---|
| Tool Requirements (e.g., javatest, jtreg, tonga, shell, etc.) | | Green | |
| Test Execution Requirements | Clean Environment | Green | |
| | Setup | Green | |
| | Execute test suite | Green | |
| | Post-processing | Red | In one example, there are no post actions. |
| | Get test results | Green | |
| | Clean Environment | Green | |
| Other Requirements | | | |
| Error Handling | Crashing | Yellow | In one example, a method is implemented to stop the system. |
| | Hanging | Yellow | |
| Notification (When done) | | Green | |
| Machine Requirements (MKS, Patches) | | Green | |
| Test Suites Available | | Yellow | In one example, a suite path is passed through a plurality of command arguments |
| JDKs Available | | Yellow | In one embodiment, java.exe is in the path environment. |
| Machine Use Detection | | Red | |
| Queue Test Suites | | Red | |
| GUI Requirements | | | |
| Machine Characteristics Matrix | | Red | |
| Result Comparison | | Red | |
| Golden JDK results | | Red | |
| Stop/Destroy Test | | Green | |
| User Profiles/Managements | | Red | |
| Logs | | Green | |
| Test Result Notification | | Red | |
| Scheduling Test | | Red | |
| Machine Statistics (Idle time, Usage Profile) | | Red | |
| Error Recovery (Net Problems) | | Red | |
| Fault Tolerant | | Yellow | In one example, fault tolerant is performed by a plurality of actions based on coordination protocol, thus minimizing faults. |
| Scaleable | | Green | In one embodiment, test suites can be easily added or deleted. |
| Demon Requirements | Version # (Compatibility) | Red | |
| | Machine Descriptions | Yellow | In one example, Demon Requirements are the basic configurations (e.g., OS, version, etc.). |

Figure 2:
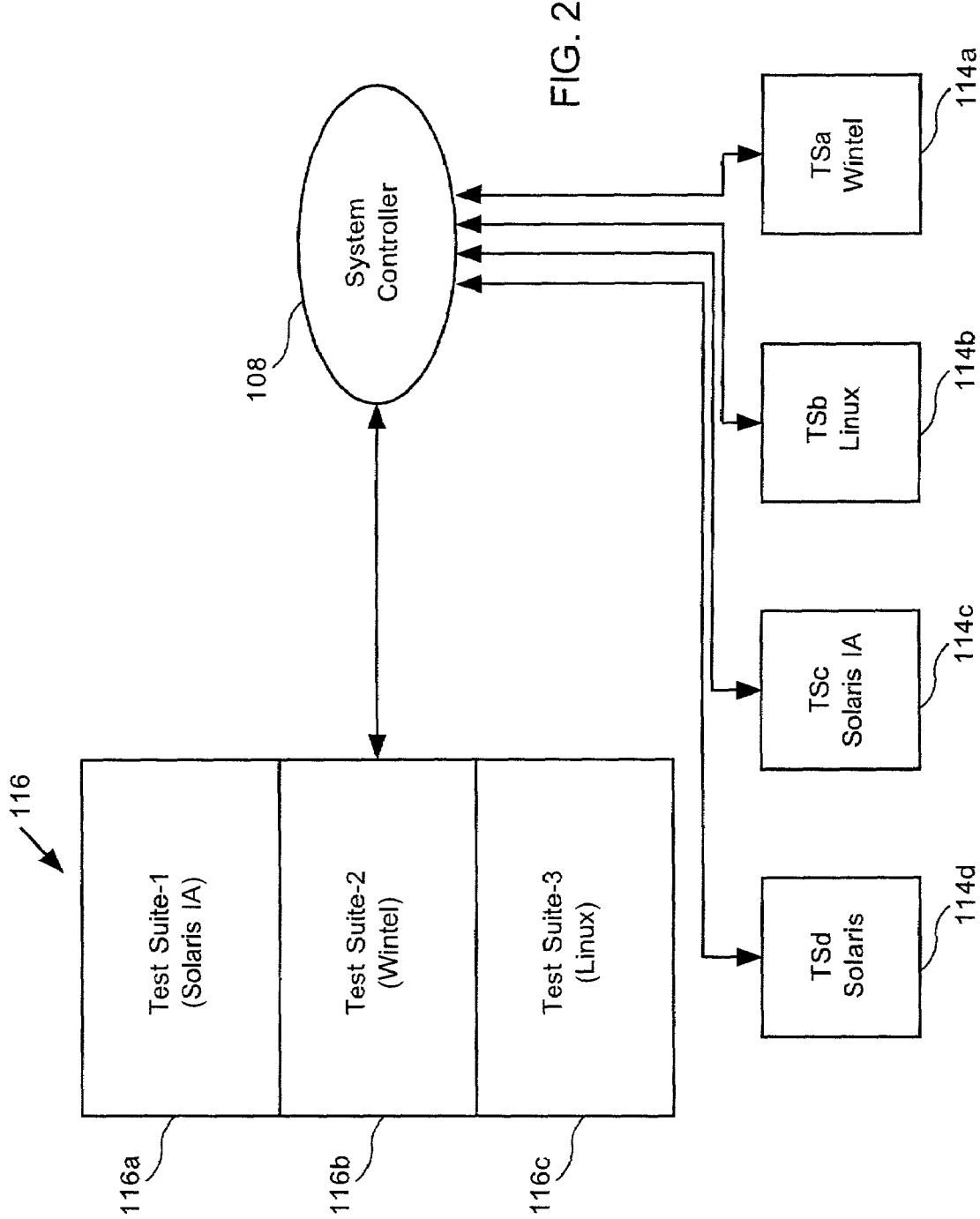
FIG. 2 is a block diagram illustrating the capability of the present invention to intelligently locate an available and suitable test system to execute a test suite, in accordance with another embodiment of the present invention.

Reference is made to a block diagram depicted in FIG. 2 wherein the capability of the DTF system to intelligently locate a test system 114 available to execute a test suite is illustrated, in accordance with one embodiment of the present invention. As shown, an inqueue directory 116 contains a plurality of test execution requests 116*a*, 116*b*, and 116*c*. In accordance with one embodiment of the present invention, once the system controller 108 is initiated, the system controller 108 is designed to read each test execution request 116*a*–116*c* contained within the inqueue directory 116. As shown, each test suite request 116*a*–116*c* must be executed by a test system 114 capable of running the test execution request requirements. For instance, each of the test execution requests 116*a*, 116*b*, and 116*c* must be run on a Solaris IA™ test system, a Wintel™ test system, or a Linux™ test system, respectively. As will be described in more detail below, the DTF system 100 has the capability to advantageously locate an available test system from a plurality of ad-hoc network of test systems 114*a*, 114*b*, 114*c*, and 114*d* to execute each of the test execution requests 116*a*–116*c*.

As shown, in the embodiment depicted in FIG. 2, each of the test systems 114*a*–114*d* has a different software and hardware configuration. For instance, while the test system 114*a* is run on Wintel™ and the test system 114*b* is run on Linux™, the test systems 114*c* and 114*d* are programmed to run on Solaris IA™ and Solaris™, respectively. As will be discussed in more detail below, the machine service for each test system 114a–114c registers the respective test system 114a–114c with the Jini look up service using the Jini attributes. Particularly, the embodiments of the present invention are configured to register the hardware and software configuration for each test system 114a–114d with the Jini look up service 104. In this manner, the system controller 108 can search the Jini look up service 104 implementing the test execution request requirements as search criteria. Thus, as shown in the example of FIG. 2, the system controller 108 of the DTF system selects the test systems 114c, 114a, and 114b to execute the test suite requests 116a–116c, respectively.

Figure 3:
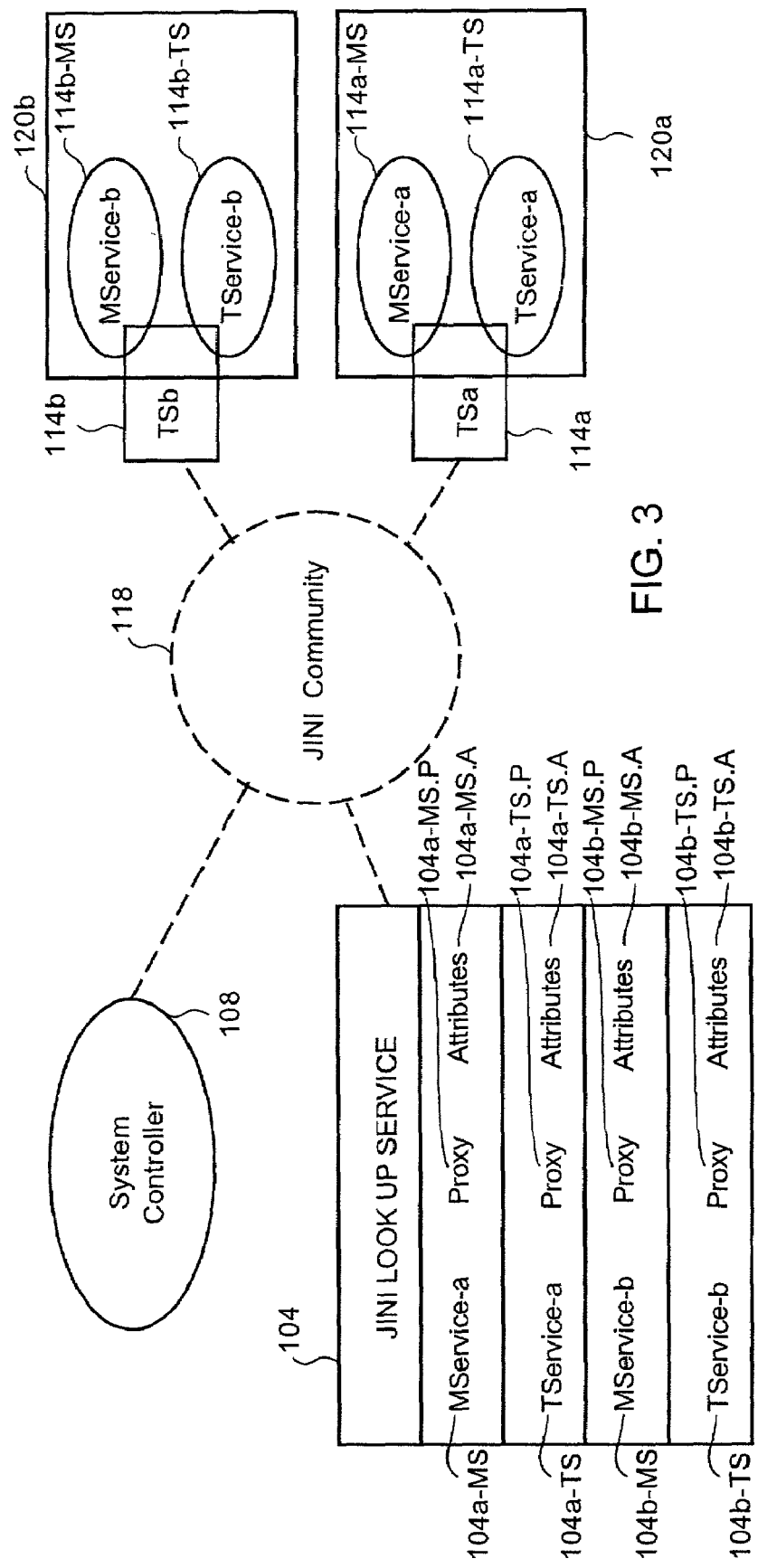
FIG. 3 is a block diagram illustrating the implementation of the test system attributes to locate a suitable test system to process a test execution request, in accordance with yet another embodiment of the present invention.

Implementing the test system attributes to locate a suitable test system to run a test execution request can further be understood with respect to the block diagram shown in FIG. 3, in accordance with one embodiment of the present invention. As shown, the test systems 114b and 114a, the system controller 108, and the Jini look up service 104 communicate to each other using Jini. In one example, the system controller 108, the Jini look up service 104, and the test systems 114a and 114b and all the other resources that are Jini capable form a virtual Jini community 118.

As shown, the test system 114a runs an agent process 120a responsible for notifying the Jini look up service 104 of the existence and configuration of the test system 114a. In one example, the agent 120a is also designed to export a downloadable image of itself. Beneficially, the downloadable image allows the system controller 108 to ask the test system 114a to initiate running a test execution request and meanwhile interact with the test system 114a as the test execution request is being processed.

The illustrated agent 120a involves two Jini services, machine service 114a-MS and test service 114a-TS. The function of the machine service 114a-MS is to advertise the availability of the test system 114a, the characteristics of the test system 114a, and the ability of the test system 114a to launch a test execution request. Additionally, the machine service 114a-MS is designed to be present on the test machine 114a at all times. As such, the machine service 114a-MS is initiated on the test system 114a at the start-up time and is configured to remain active on the test system 114a until the test system 114a is shut down.

Comparatively, the test service 114a-TS is a module configured to encapsulate the test execution request. As designed, the test service 114a-TS is spawned by the machine service 114a-MS and is subsequently launched when the machine service 114a-MS receives a request to start running a test execution request from the system controller 108. Specifically, the new test service 114a-TS is spawned based on the test execution request type. By way of example, in one embodiment, the machine service 114a-MS spawns separate test systems 114a-TS when running Tonga-type, JCK-type, JTREG-type, and shell-type test suites. However, one having ordinary skill in the art must appreciate that in a different example, the machine services of the DTF system of the present invention are configured to spawn other suitable test systems. As shown, similar to test system 114a, the test system 114b is configured to include an agent 120b designed to include a machine system 114b-MS and a test system 114b-TS.

As will be discussed in more detail below and as shown in the implementation of FIG. 3, the machine service 114a-MS and test service 114a-TS respectively register Jini attributes 104a-MS.A and 104a-TS.A of the test system 114a with the Jini look up service 104. For instance, in one embodiment, the sequence of events in registering the machine service 114a-MS and test service 114a-TS may be as follows: Once the test-system 114a discovers and joins the Jini community 118, the test service 114a-MS of the test system 114a registers with the Jini look up service 104. In this manner, the machine service 114a-MS registers a machine service proxy 104a-MS.P and the attributes 104a-MS.A of the machine service 114a-MS with the look up service 104. The Jini attributes 104a-MS.A are used by the system controller 108 to locate a test service having attributes suitable to run the test execution request.

Once the test system 114a has been selected to run the test execution request, the machine service 114a-MS spawns a test service 114a-TS having the same type as the test execution request. As discussed above, the machine service 114a-MS is configured to spawn a matching test service 114a-TS for each test execution request type. For example, the test system 114a may have the attributes to run a Tonga test execution request and a JTREG type test execution request. Thus, in such a situation, the Jini look up service 104 will include two test services each running a different type of test execution request. In this manner, when the processing of the test execution request has concluded, the test service 114a-TS having substantially the same type can be terminated. Thus, for the most part, the test service 104a-TS, 104a-TS.A, and 104-TS.P are designed to substantially exist while the test system 114a is running a test execution request. In this manner, the system controller 108 can determine whether the test system 114a is processing a test execution request. Specifically, this is achieved by the system controller 108 simply querying the Jini look up service 104 as to whether the test system 114a has an associated existing test service.

In addition to registering the attributes 104a-MS.A and 104a-TS.A, the machine service 114a-MS and the test system 114a-TS are configured to respectively register a corresponding machine service proxy 104-MS.P and a respective test service proxy 104-TS.P with the Jini look up service 104. As designed, the system controller 108 implements the machine service proxy 104-MS.P and the test service proxy 104-TS.P to communicate with the test system 114a. Particularly, once the system controller 108 has selected the test system 114a to run the test execution request, the system controller 108 downloads the machine service proxy 104-MS.P from the Jini look up service 104. Once the machine service proxy 104-MS.P is downloaded, the system controller 108 starts communicating with the machine service proxy 104-MS.P rather than communicating directly with the corresponding test system 114a or the machine service 114a-MS.

In a like manner, the test service proxy 104-TS.P is the communication channel between the system controller 108 and the test service 114a-TS. Thus, similar to the machine service 114a-MS, the system controller 108 downloads the test service proxy 104-TS.P from the Jini look up service 104. Thereafter, the system controller communicates with the test service proxy 104-TS.P as if it were communicating with the test system 114a or the test service 114a-TS. As shown, in the same manner, the machine service 114b-MS and test service 114b-TS register their respective machine service proxy 104b-MS.P and machine service attributes 104b-MS.A as well as the respective test service proxy 104b-TS.P and test service attributes 104b-TS.A with the Jini look up service 104.

Figure 4:
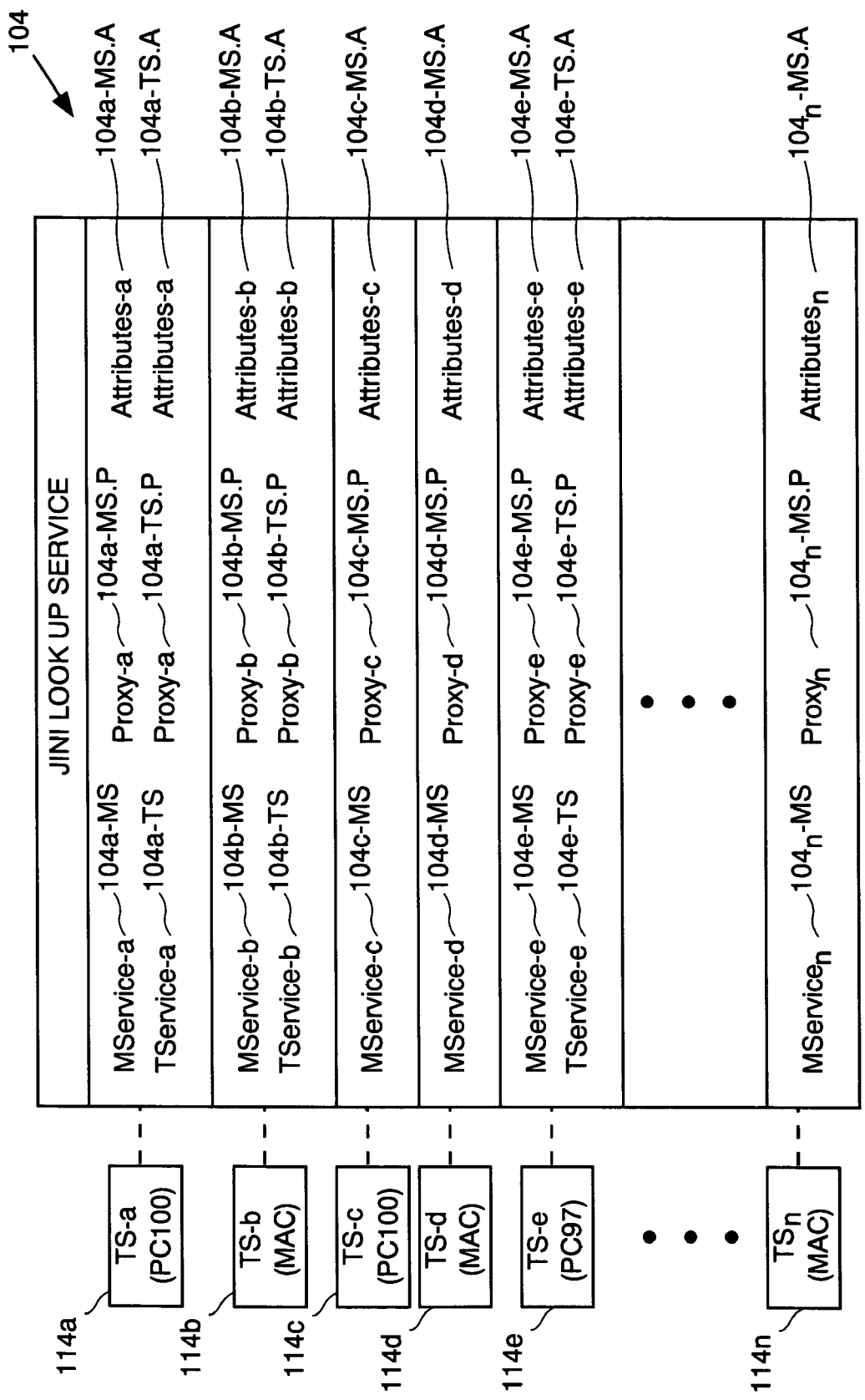
FIG. 4 is a block diagram illustrating the capability of the present invention to locate an available and suitable test system to process a test execution request having a set of specific requirements, in accordance to yet another embodiment of the present invention.

The capability of the present invention to determine the availability of a test system to process a test execution request having a set of specific requirements can further be understood with reference to the block diagram of FIG. 4, in accordance to one embodiment of the present invention. As illustrated, a plurality of test systems 114a–114n respectively being a PC 100, Macintosh, PC 100, Macintosh, PC 97, and Macintosh are registered with the Jini look up service 104. That is, for each test system 114a–114n, the Jini look up service 104 contains an associated machine service 104a-MS to 104n-MS. In a like manner, for each machine service 104a-MS to 104n-MS, the Jini look up service 104 includes a corresponding machine service proxy 104a-MS.P to 104n-MS.P and the associated machine service attributes 104a-MS.A to 104n-MS.A.

Although for each test system 114a–114n a machine service entry can be found in the Jini look up service 104, only test systems 114a, 114b and 114e have associated test services 104a-TS, 104b-TS, and 104e-TS. Further more, as shown, for each of the test systems 114a, 114b and 114e, the Jini look up service 104 includes the corresponding test system proxy 104a-TS.P, 104b-TS.P, and 104e-TS.P and the respective test system attributes 104a-TS.A, 104b-TS.A, and 104e-TS.A. In one embodiment, having associated test systems in the Jini look up service are the indications of the busy status of the test systems 114a, 114b, and 114e, respectively.

For instance, at this point, when the system controller 108 receives a test execution request requiring to be processed by a PC 100, the system controller 108 searches for an available PC 100 test system. While searching the Jini look up service 104, the system controller 108 will first locate the machine service 104a-MS. Despite machine service 104a-MS having the required attribute (i.e., being a PC 100), the system controller 108 will have to by pass this entry, as the test system 114a is busy. The system controller 108 detects the unavailability of test system 114a by the Jini look up service 104 including the test service 104a-TS associated with the test system 114a. Subsequently, in search of the next available PC 100 test system, the system controller locates machine service 104c-MS. However, this time, the Jini look up service does not include a test system associated with the test system 114c, thus revealing the test system 114c availability to execute the test execution request.

As will be discussed in more detail below, in one implementation, the lack of a corresponding test service in the Jini look up service 104 occurs once the test execution request has concluded and the test service 104a-TS lease with the Jini look up service 104 has expired. Thus, once the test service 104a-TS and its associated proxy 104a-TS.P and attributes 104a-TS.A have been removed from the Jini look up service 104, the test system 114a can then be selected to execute a different test execution request. Depending on the type of the test execution request, a different or the same type of test service 114a-TS is spawned by the machine service 114a-MS, again indicating the busy status of the test system 114a.

Figure 5:
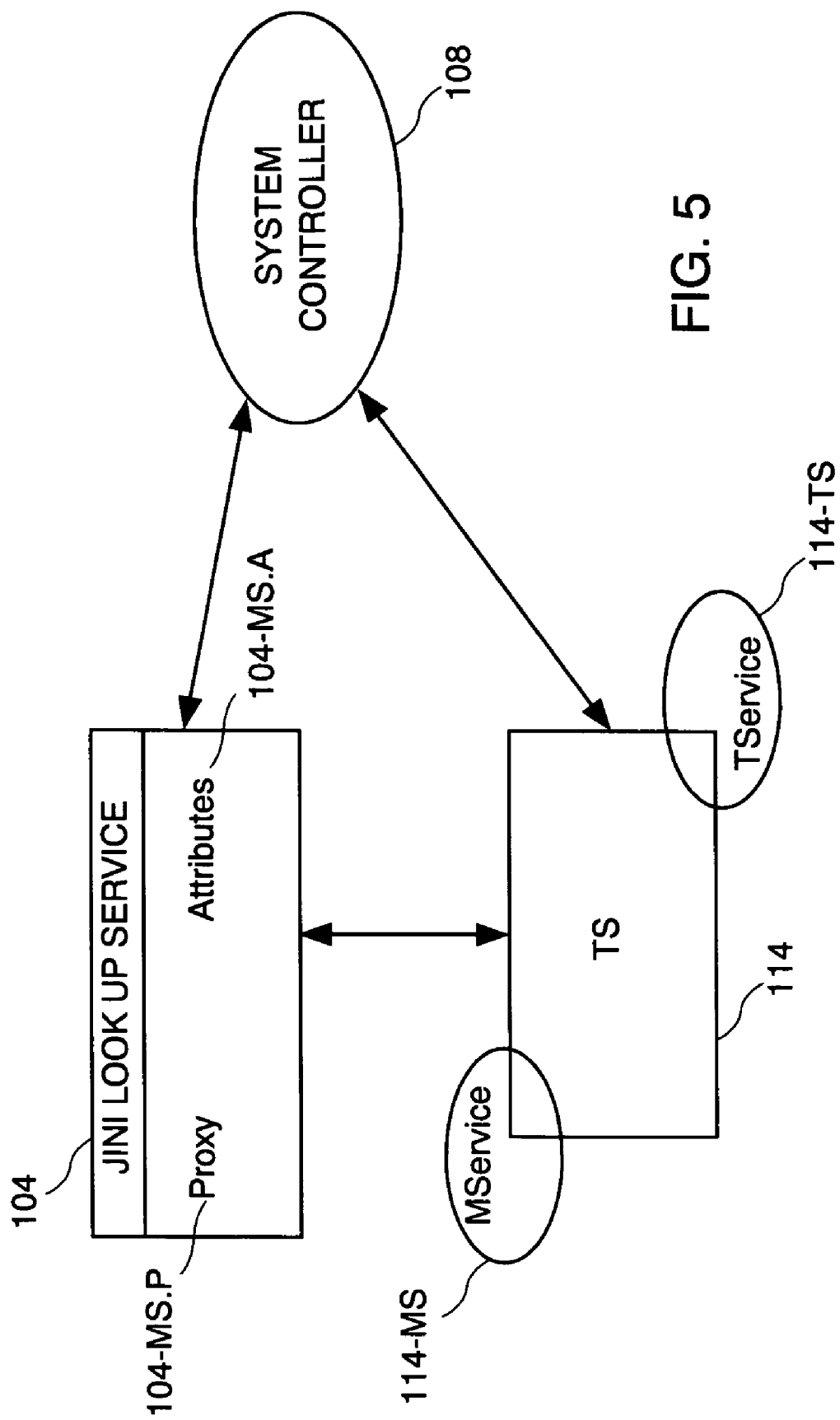
FIG. 5 is a block diagram depicting the one-to-one communication between the system controller, Jini™ look up service, and a test system of a DTF system, in accordance to still another embodiment of the present invention.

Reference is now made to FIG. 5 depicting the one-to-one communication between the system controller 108, Jini look up service 104, and test system 114 of the DTF system, in accordance with one embodiment of the present invention. As shown, enabled by the Jini technology, a machine service 114-MS component of the test system 114 discovers the Jini look up service 104. Thereafter, the machine service 114-MS joins the Jini look up service 104 by registering a plurality of Jini attributes 104-MS.A and a machine system proxy 104-MS.P with the Jini look up service 104.

Seeking a test system to execute a given test execution request, the system controller 108 discovers the Jini look up service 104. Subsequently, the system controller 108 searches the Jini look up service 104 for a test system suitable to run the test execution request. Once the system controller 108 has determined that the test system 114 has machine service attributes 104-MS.A matching to that required to run the test execution request, the system controller 108 downloads the machine service proxy 104-MS.P from the Jini look up service 104. From then on, the system controller 108 starts communicating with the machine service proxy 104-MS.P as if communicating with the machine service 114-MS. At this point, the system controller 108 communicates with the machine service proxy 104-MS.P requesting the execution of the test execution request.

Subsequent to receiving this request, the machine service 114-MS spawns a test service 114-TS which type matches that required by the test execution request. Next, a test service proxy 104-TS.P and test service attributes 104-TS.A of the test service 114-TS are then registered with the Jini look up service 104. Thereafter, the system controller 108 downloads the test service proxy 104-TS.P and communicates with the test system proxy 104-TS.P as if communicating with the test system 114-TS. Then, the test service 114-TS receives the test execution command from the system controller 108, thus initiating the test execution request.

As was discussed in more detail above, once the test execution has concluded, the test service 114-TS lease with the Jini look up service 104 expires, thus triggering the removal of the test system proxy 104-TS.P and test system attributes 104-TS.A from the Jini look up service 104. In this manner, the system controller 108 associates the availability of the test system 114 to run the next test execution request with the test system 114 lacking of a registered test service proxy 104-TS.P.

Figure 6:
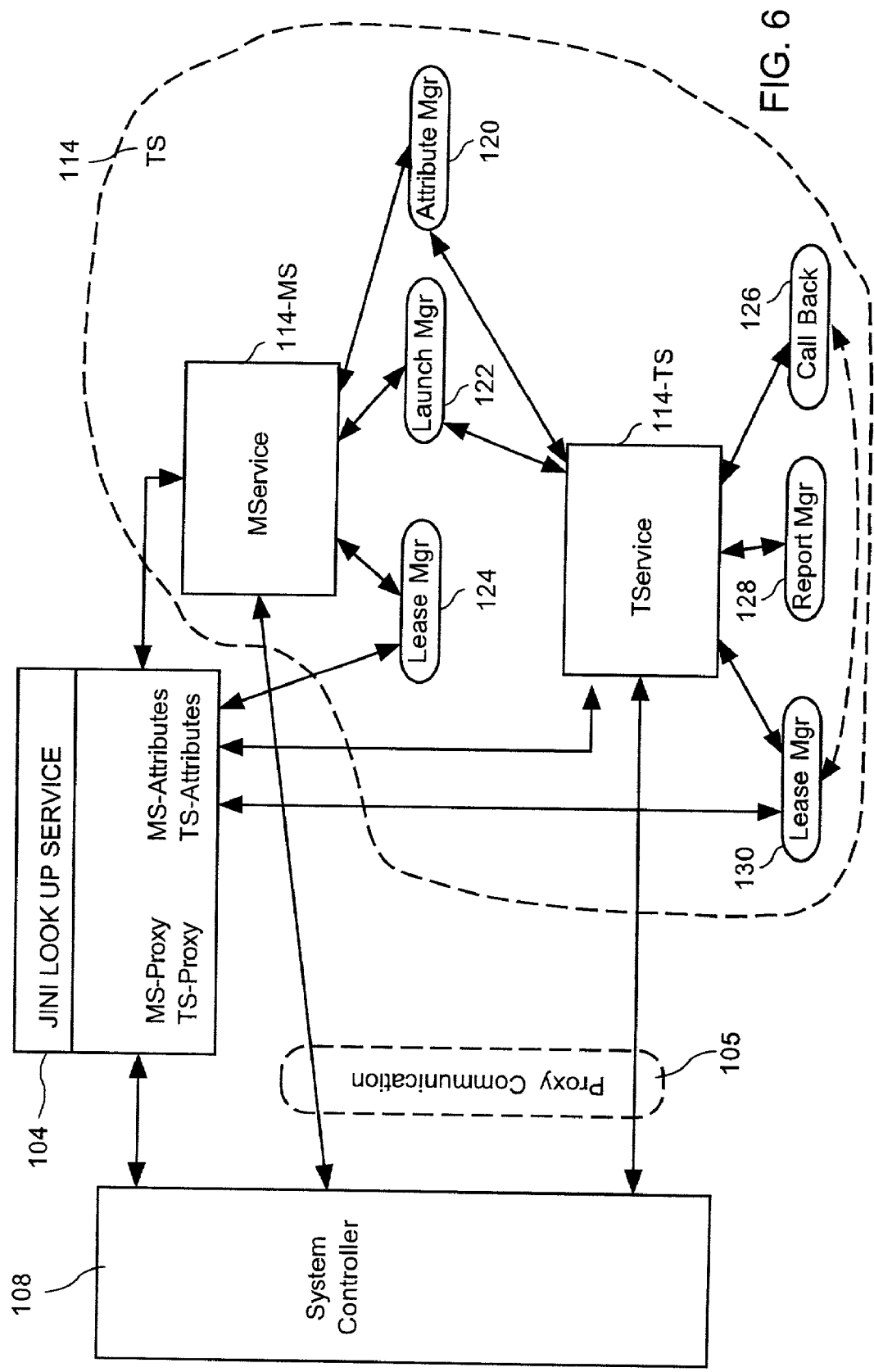
FIG. 6 is a block diagram showing the interaction between the Jini look up service, system controller, and a test system, in accordance with still another embodiment of the present invention.

Proceeding to the block diagram of FIG. 6, the interaction between the Jini look up service 104, system controller 108, and test system 114 can further be understood, in accordance with one implementation of the present invention. As discussed in more detail above, the test system 114 includes a machine service 114-MS and a test service 114-TS. As designed, the machine service 114-MS includes a lease manager 124, a launch manager 122, and an attribute manager 120 while the test system 114-TS includes a call back 126, a report manager 128, and a lease manager 130.

In one example, the interaction between the DTF system components starts by the test system 114 discovering the Jini look up service 104. Subsequent to this discovery, the machine service 114-MS communicates with the attribute manager 120, obtaining the test system 114 attributes. Thereafter, the machine service 114-MS joins the Jini look up service 104 by registering the machine service 114-MS proxy and machine service attributes with the Jini look up service 104. As part of registering the machine service 114-MS with the look up service 104, the lease manager 124 leases the machine service 114 for a specific period of time. That is, the lease manager 124 registers the availability of the test system 114 to execute a test execution request for a specific period of time. However, before the leased period is expired, the lease manager 124 can renew the lease with the Jini look up service 104. In this manner, once the test system 114 is removed from the ad-hoc network of the distributed test systems, the machine service proxy, machine service attributes, test service proxy, and test service attributes are automatically removed from the Jini look up service 104 as soon as the lease is expired.

At this point, the system controller 108 scans the inqueue directory, reading the required attributes for running the first test execution request in the in-queue (i.e., the wait queue). The system controller 108 then searches the Jini look up service 104, looking for a test system having attributes matching to that required by the test execution request (or computer process) to be processed. Once the system controller 108 determines that the test system 114 is a suitable test system to run the test execution request, the system controller 108 downloads the machine service proxy for the test system 114 from the Jini look up service 104. As soon as the machine service proxy is downloaded, the system controller 108 communicates with the machine service proxy as if communicating with the test system 114. At this point, the test execution is initiated by the system controller 108 dispatching a start execution request to the machine service 114-MS.

Once the launch manager 122 component of the machine service 114-MS receives the system controller 108 request to start test execution, the launch manager 122 spawns the appropriate test service 114-TS. Specifically, the test service 114-TS type spawned by the launch manager 122 is determined by the test execution request requirements dispatched by the system controller 108. Irrespective of the test service 114-TS type, the lease manager 130 of the test system 114-TS is configured to register the test system attributes and a test system proxy with the Jini look up service 104. Again, like the machine service 114-MS, the test service 114-TS registers its availability to execute the test execution request with the Jini look up service 104 for a specified lease period. At this point, the system controller 108 downloads the test service proxy from the Jini look up service 104 and communicates with the test system proxy as if the system controller 108 is communicating with the test service 114-TS.

Once the test service 114-TS starts executing the job, the test service 114-TS sends an event to the system controller 108 indicating the commencement of the test execution request processing. In one embodiment, the test service 114-TS is designed to send additional events during the running of the test execution request and upon its conclusion. At the conclusion of running the test execution request, the call back component 126 is configured to communicate with the lease manager 130 signaling the conclusion of processing the test execution request. Once the lease manager 130 receives such communication, the lease manager 130 communicates with the Jini look up service 104 signaling the expiration of the test suite 114-TS lease with the Jini look up service 104. Upon the expiration of the test suite 114-TS lease with the Jini look up service 104, the test suite 114 proxy and test suite 114 attribute entries are removed from the Jini look up service 104, thus pointing out the availability of the test system 114 for processing another suitable job.

The test result data generated by the processing of the test execution request are collected, categorized, and maintained by the report manager 128. In one embodiment, the report manager 128 analyzes and generates a test report implementing the test result data. Thus, in one embodiment of the present invention, the test systems 114 of the DTF system generate test reports using the results generated by the processing of an associated test execution request. However, in a different embodiment, the test results generated by each test system 114 may be utilized so as to create a test result summary report, covering the test results produced by each of the test systems 114.

Figure 7:
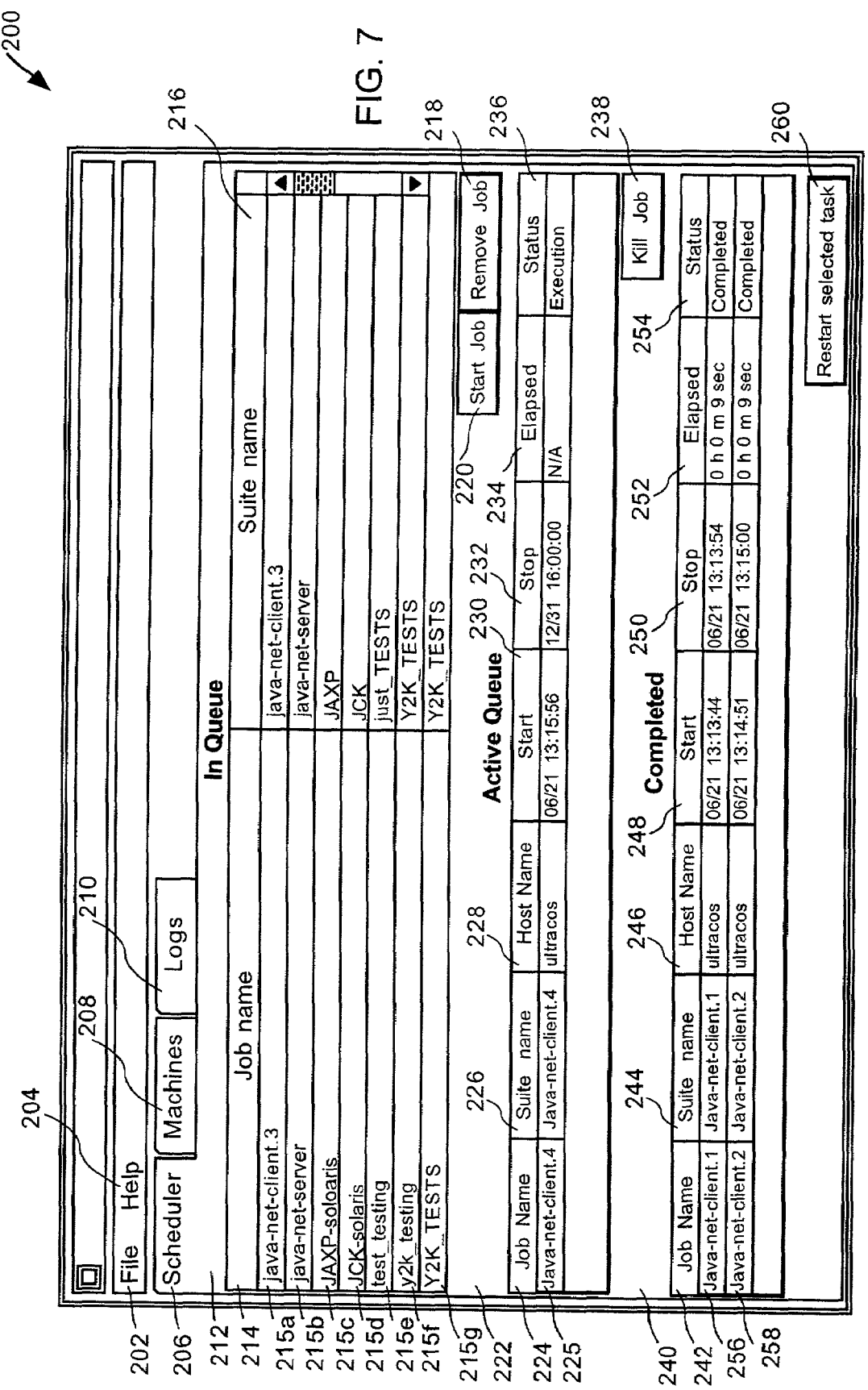
FIG. 7 is depicts a DTF utility graphical user interface (GUI), in accordance to yet another embodiment of the present invention.

User interfaces implemented in test execution request submission, test execution request scheduling and execution, and managing the ad-hoc network of the distributed resources can further be understood with reference to a DTF utility graphical user interface (GUI) 200 illustrated in FIG. 7, in accordance with one embodiment of the present invention. As shown in the example of FIG. 7, the DTF utility GUI 200 may include a tool bar containing a plurality of pull down menus such as "File" 202 and "Help" 204. As further illustrated, in one implementation, the DTF utility GUI 200 of the present invention enables a user of the master computer system (i.e., the server) to monitor and obtain information regarding different components of the DTF system. For instance, in the embodiment of FIG. 6, the DTF utility GUI 200 is configured to provide information regarding the status of a scheduler 206, machines 208, and logs 210 components of the DTF system. However, in a different embodiment, the DTF utility GUI 200 may provide the user with the real-time status of any of the components of the DTF system.

The scheduler 206 shown in the DTF utility GUI 200 is configured to gather and maintain data in a temporary data holding place such as a queue. In one embodiment, the scheduler 206 keeps track of the status of the submitted test execution requests by maintaining an in-queue 212, an active queue 222, and a completed queue 240. The exemplary in-queue 212 includes a job name field 214 and a suite name field 216 for maintaining job name and the corresponding test suite name for each job entry 215*a*–215*g*. As shown, while job names for job entries 215*a* and 215*b* are substantially identical to the corresponding test suite name for job entries 215*a* and 215*b*, job names for the job entries 215*c*–215*g* are not identical to the test suite names for the job entries 215*c*–215*d*. For the most part, this occurs because for execution purposes, a test suite may be divided into test execution requests (i.e., jobs) expediting the processing of the test suite.

In one embodiment, to reduce the extent of human interaction, the test execution requests are submitted to the DTF system through the system controller 108. Specifically, once the system controller 108 is initiated, the system controller 108 is configured to scan the XML files within the inqueue directory and then read the XML files including a "testrequest" tag. Then, these test execution requests and their test suites are used to initialize the in-queue 212. However, one of ordinary skill in the art must appreciate that in a different implementation, any appropriate mechanism may be used to place the test execution requests into the in-queue 212.

As shown, the DTF utility GUI 200 provides the user of the master computer system (i.e., the server) the capability to initiate the processing of any of the job entries 215*a*–215*g* using a start job button 220. Similarly, the user of the master computer system is given the opportunity to delete any of the job entries 215*a*–215*g* and their associated suite names through implementing a remove job button 218.

While in-queue 212 contains the test execution requests waiting to be executed by the suitable test system, the active queue 222 contains the test execution requests currently being executed. As illustrated, the active queue 222 implements a plurality of fields such as job name 224, suite name 226, host name 228, start 230, stop 232, elapsed 234, and status 236 to monitor the jobs during the execution. Thus, in the depicted example, a job entry 225 having a job name "java-net-client 4" and a suite name "java-net-client 4" started executing on 13:15:56 on June 21 and is configured to be executed until 16:00:00 on December 31, As shown, the status 236 for the job entry 225 indicates that the job entry 225 is in "execution" by the test system "ultracos." Similar to the in-queue 212, the active queue 222 provides a master computer user an opportunity to terminate the execution of the jobs by pressing a kill job button 238.

In a like manner, the completed queue 240 contains a plurality of fields, job name 242, suite name 244, host name 246, start 248, stop 250, elapsed 252, and status 254 field configured to collect and maintain data concerning the status of completed jobs. As indicated in the status 254 field for both job entries, the execution of a job entry 256 and a job entry 258 has concluded. Also, as depicted, the elapsed time for each job entry 256 and 258 is shown to be about 9 seconds. Again, a restart selected task 260 button is configured to provide the user of the master computer service the opportunity to re-run the completed job. Thus, in one embodiment, by selecting a completed job, while pressing a restart selected task button 260, the completed job will be removed from the completed queue 240 and is placed in the inqueue 212. In this manner, the completed job can be run again.

Figure 8:
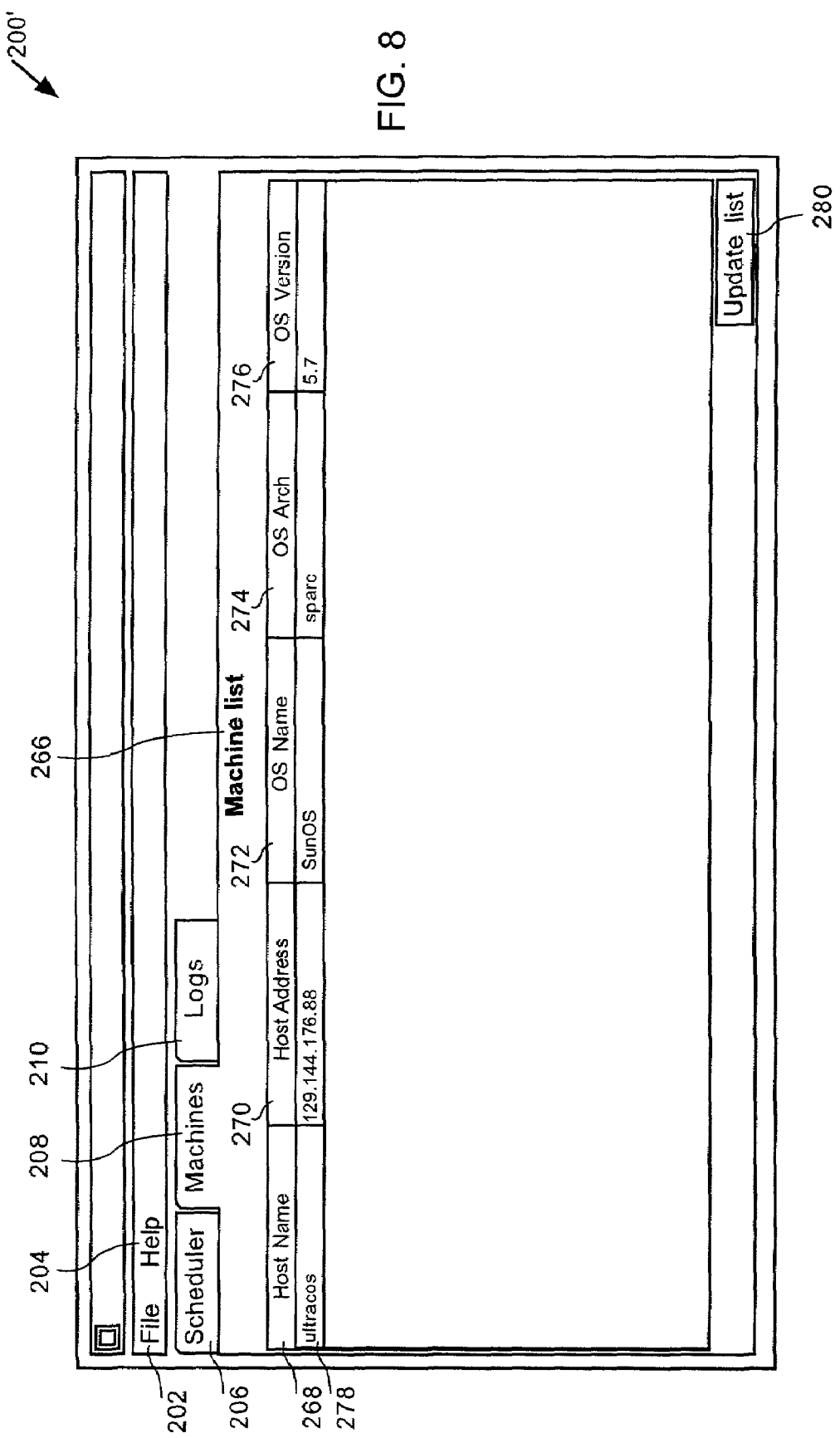
FIG. 8 is a DTF utility graphical user interface (GUI), in accordance to yet another embodiment of the present invention.

A DTF utility GUI 200' depicting in FIG. 8 provides information regarding the status of machines 208 of the DTF system, in accordance with one embodiment of the present invention. Specifically, the DTF utility GUI 200' is configured to provide a list of test machines creating the impromptu Jini community of test systems. The machines list 266 includes a plurality of fields such as host name 268, host address 270, operating system (OS) name 272, OS architecture 274, and OS version 276. For instance, in the embodiment illustrated in FIG. 7, the machine list 266 includes one machine entry 278 having a host name "ultracos," and a Java™ binary host address 129,144,176.88, Additionally, as shown, the machine entry 278 has a version 5.7 Sun™ solaris operating system with a sparc architecture. The illustrated DTF utility GUI 200' also provides the master computer user an update list 280 button, giving the user the opportunity to update the status of the machines list 266, when needed or if necessary.

Figure 9:
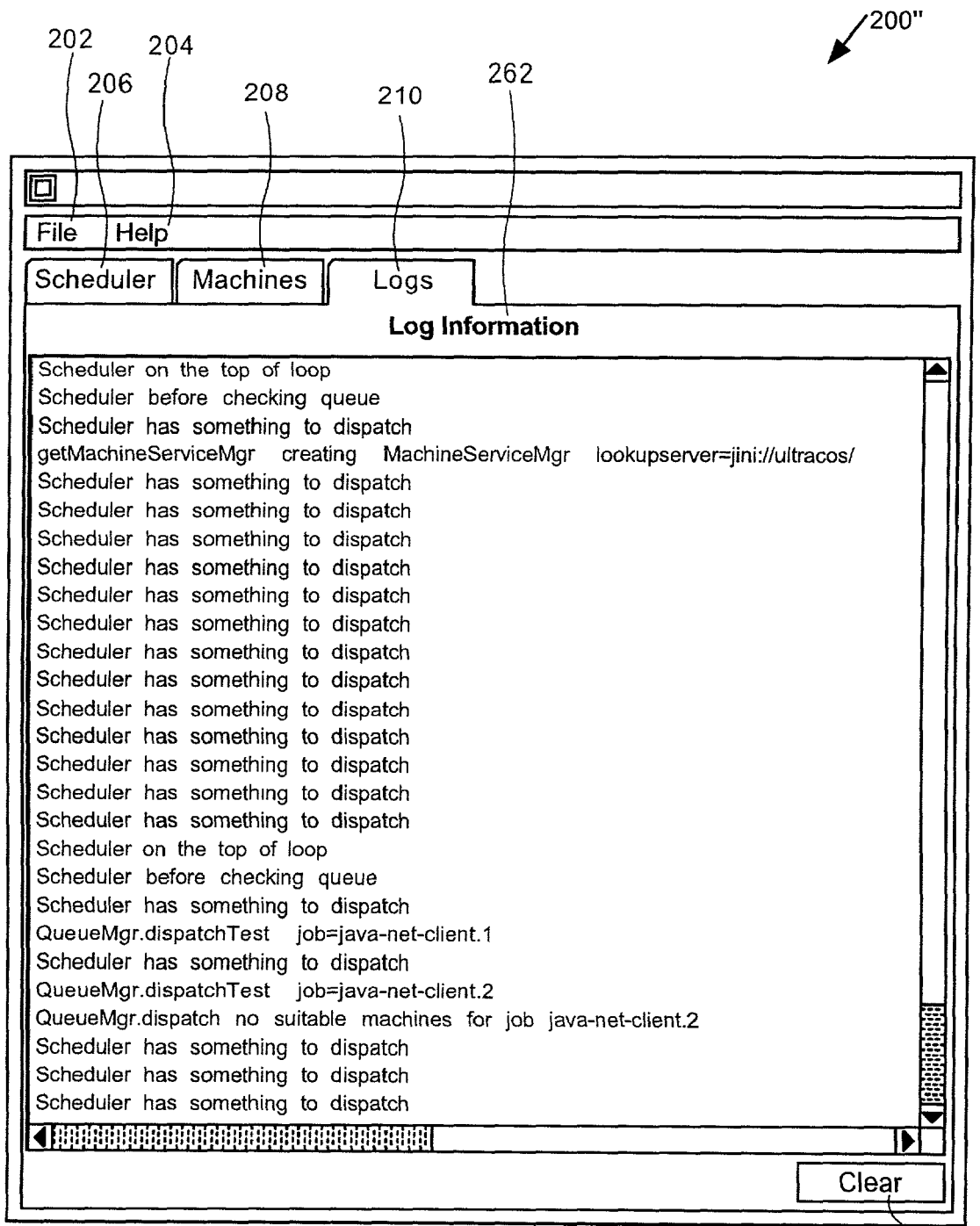
FIG. 9 is a DTF utility graphical user interface (GUI), in accordance to still another embodiment of the present invention

Reference is now made to DTF utility GUI 200" illustrating the contents of the logs 210 component of the DTF system, in accordance with one embodiment of the present invention. As shown, the logs 210 component includes a list entitled a DTF log information 262. For instance, in the implementation depicted in FIG. 9, the logs 210 component is configured to maintain a list of certain actions performed by some of the DTF system components (e.g., scheduler, machine service lookup service, etc.). In one example, the list actions performed by some of the DTF system components can be cleared using a clear button 264.

It must be noted that the DTF utility may be implemented on master computer systems (i.e., servers) having different platforms and environments. For instance, in one implementation, the DTF utility may be run in a Windows™ environment, and be launched by using the Programs submenu of Windows™ Start menu.

Figure 10:
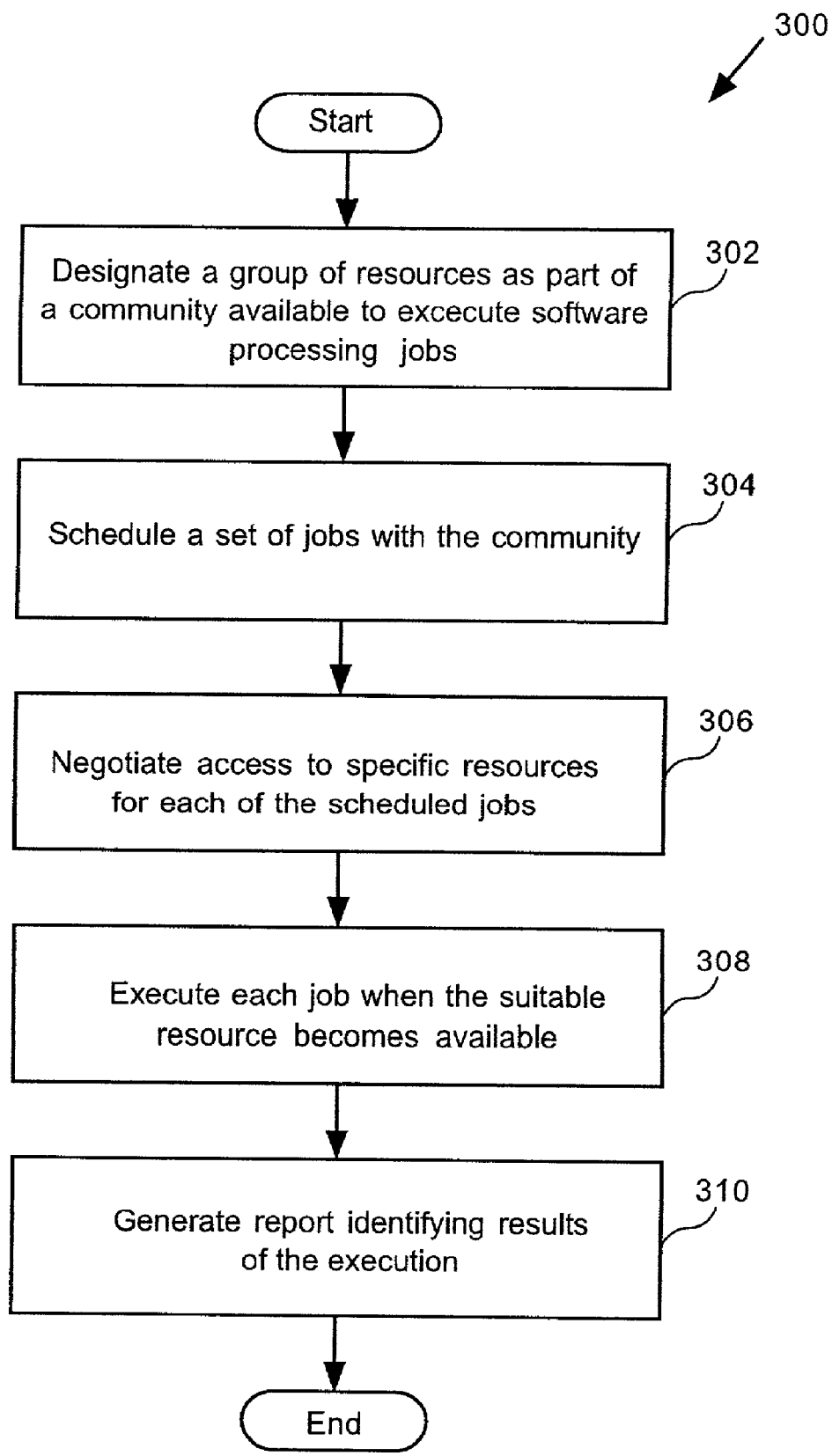
FIG. 10 is a flow chart diagram illustrating a method operations implemented by a distributed process framework (DPF) system to execute a process, in accordance with yet another embodiment of the present invention.

Reference is now made to a flow chart diagram 300 of FIG. 10 illustrating a method operations implemented to execute a process by the distributed process framework system, in accordance with one embodiment of the present invention. The method begins in operation 302 in which a group of resources as part of a community available to execute software processing jobs is designated. In one embodiment, this task is achieved by the group of resources joining a look up service implementing a proxy and a set of attributes associated with each of the resources. By way of example, the group of resources may include a plurality of ad-hoc networked computer systems, which register with Jini look up service, indicating their availability to execute a software process job. In one implementation, computer systems are test systems configured to process a test execution request (e.g., a job). Each of the test systems registers with the Jini look up service using a machine service designed to have a proxy and a set of attributes.

Proceeding to operation 304, the processing of a set of jobs is scheduled with the resources of the community. In one embodiment, each of the software processing jobs contained within the inqueue directory are scanned and depending on availability of a resource to execute the software processing job, is read either into a wait queue or an execution queue. Next, in operation 306, access to specific resources are negotiated for each of the scheduled jobs. That is, a system controller searches the look up service seeking an available resource having the attributes substantially similar to that required by the software processing job. Once such resource has been located, the system controller communicates with the resource by obtaining machine service proxy associated with the located resource.

Next, in operation 308, each of the scheduled jobs is executed when a suitable resource becomes available. That is, after obtaining the proxy from the look up service, the system controller dispatches a software processing job execution request, initiating the processing of the software processing job. In one embodiment, when executing a test execution request, the machine service spawns a test service configured to include a proxy and a set of attributes. Once the test service is spawned, its proxy and the attributes are registered with the Jini look up service. At this point, the system controller obtains the proxy so as to initiate the test execution request. Next, in operation 310, a report identifying the results of the process execution is generated.

Thus, beneficially, the distributed process framework system allows a software process be executed by a group of ad-hoc network of resources such that substantially minimum administration is required. In this manner, adding and deleting of resources have almost minimum effect on the execution of a software processing job.

Figure 11:
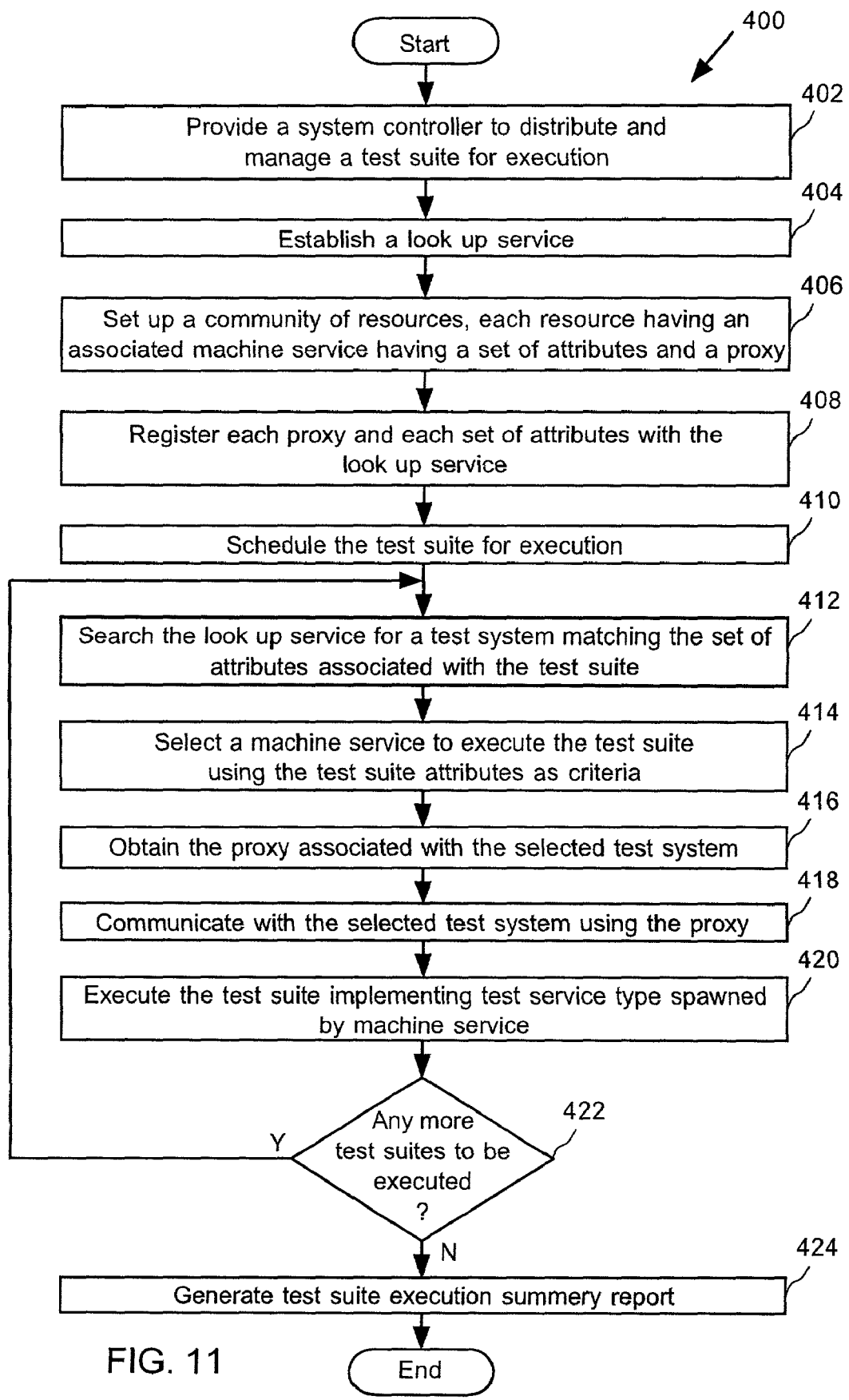
FIG. 11 is a flow chart diagram illustrating the method operations implemented by a distributed test framework system in executing a test suite, in accordance with still another embodiment of the present invention.

The method operations implemented in executing a test suite by the distributed test framework system is shown in a flow chart diagram 400 illustrated in FIG. 11, in accordance with one embodiment of the present invention. The method begins with operation 402 in which a system controller to distribute and manage a test suite submitted for execution is provided. As discussed in more detail above, the system controller maintains a suite directory wherein the description of each test suite is kept in an XML formatted file. Next, in operation 404 a look up service is established, which in one embodiment is a Jini look up service. In one example, the Jini look up service is a dedicated process, which runs on a particular computer system. For instance, the Jini look up service may be run on the system server, which includes the system controller.

Subsequently, a community of resources is set up in operation 406. Each of the resources is configured to include an associated machine service designed to have a set of attributes and a proxy. For instance, in one embodiment, the resources are test systems having similar or dissimilar software and hardware configuration. The test systems software and/or hardware configuration are registerable attributes, which are used by the system controller to locate and select an available suitable test system.

Proceeding to operation 408, each proxy and each set of attributes are registered with the look up service. In operation 410, the test suite is scheduled for execution. For instance, each of the test suites stored in the XML formatted in-queue directory are read by the system controller and placed in an inqueue queue. Next, in operation 412, the look up service is searched for a test system having attributes matching the set of attributes associated with the test suite to be executed. Continuing to operation 414, a machine service is selected to execute the test suite using the test suite attributes as criteria. Thereafter, in operation 416, the proxy associated with the selected test system is obtained. In one embodiment, this task is achieved by the system controller downloading the selected test system proxy.

Moving to operation 418, the proxy is used to communicate with the test system. For instance, the system controller communicates with the selected test system proxy as if communicating with the test system. In one implementation, the system controller dispatches a test execution request to the proxy, initiating the test suite execution. Next, in operation 420, the test suite is executed implementing the test service type spawned by the machine service. In one example, the machine service spawns the test service configured to have a test service proxy and the set of attributes. Once spawned, the test service proxy and the set of attributes are registered with the Jini look up service, indicating the unavailability of the test machine to execute a test suite requiring similar configuration. Continuing to operation 422, a determination is made as to whether there are any more test suites to be executed. If a determination is made that more test suites exist to be executed, the method continues to operation 412 in which the look up service is searched for a test system having attributes matching to that required by the test suite being executed. However, if it is determined that all the test suits have been executed, the method moves to operation 424, in which a test suite execution summary report is generated.

II. Processing Resource for Use in a Distributed Processing Framework System

Figure 12:
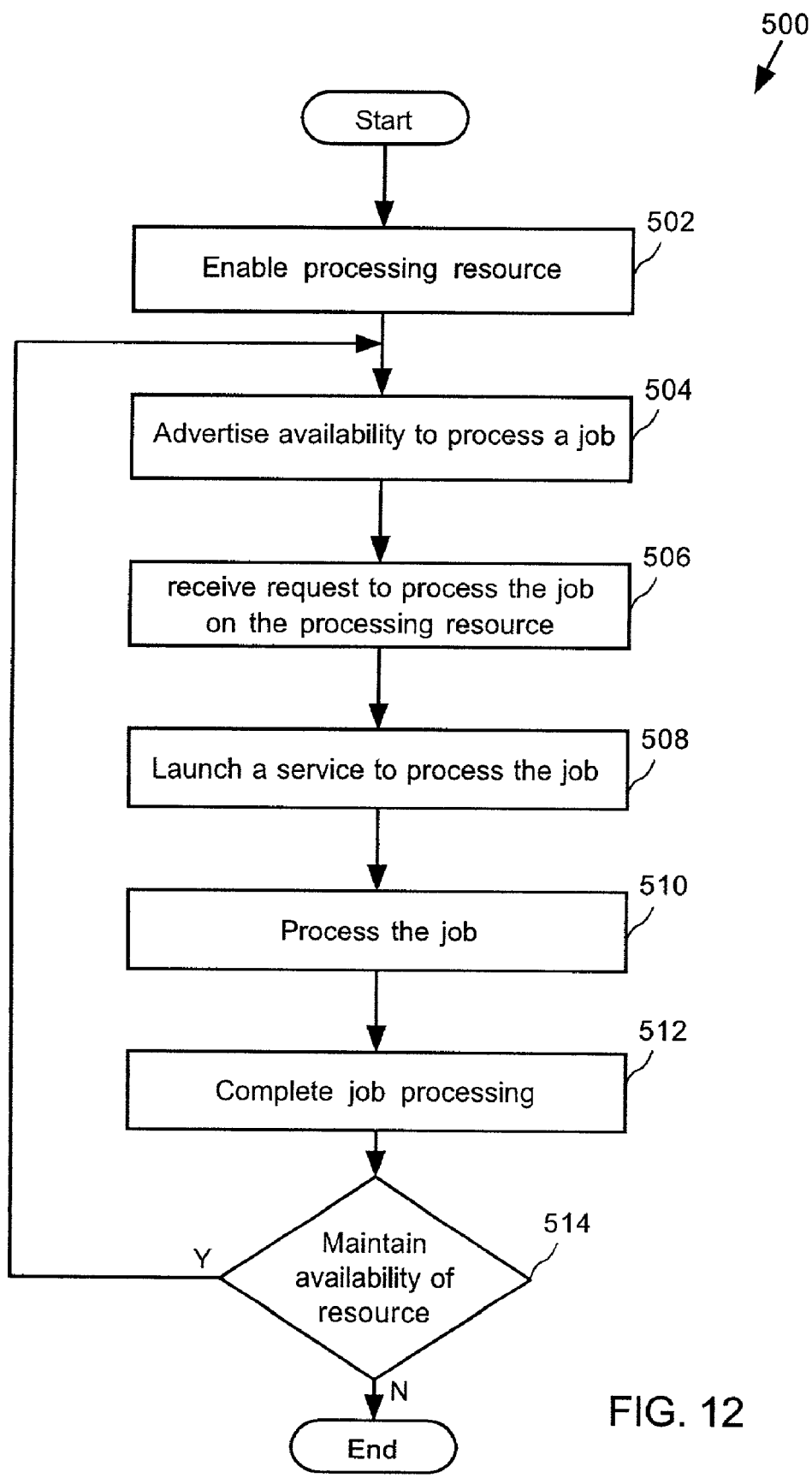
FIG. 12 is a flow chart diagram of a method operations performed in executing a job by a processing resource, in accordance with yet another embodiment of the present invention.

With the description of the distributed processing framework system in mind, reference is now made to flow chart diagram 500 of FIG. 12 depicting a method operations in executing a job by a processing resource, in accordance with one embodiment of the present invention. As shown, the method begins in operation 502 in which the processing resource is enabled. In one embodiment, this operation is performed by turning on the processing resource. In a different example, where the processing resource is already on, irrespective of whether the processing resource is being used for other processing purposes, the processing resource is enabled by dispatching a signal indicating the availability of the resources of processing resource to execute a job. Thereafter, in operation 504, the processing resource advertises its availability to process a job. As discussed earlier, in one example, this occurs by a machine service component of the processing resource agent process registering with a registry service (e.g., Jini look up service). Specifically, the machine service proxy and the set of machine service attributes are registered with the Jini look up service for a specific period of time (i.e., lease period). As discussed above, the set of machine service attributes are configured to be used by the system controller to locate the suitable processing resource to process the job. It must be understood by one having ordinary skill in the art that in a different embodiment, any suitable method can be implemented to advertise the availability of the processing resource (e.g., a web page acting as a system controller, etc.).

Proceeding to operation 506, the processing resource receives a request to process the job on the processing resource. In one example, as discussed above, once the system controller selects a processing resource to execute a job, the system controller is configured to obtain the processing resource proxy so as to start communicating with the machine service and the processing resource. Subsequent to downloading the machine service proxy, the system controller dispatches a start job execution request to the processing resource. Next, in operation 508, a process service is launched to process the job. In one implementation, the machine service is configured to spawn the process service having a type that is substantially similar to the type of the job to be processed. As discussed in more detail above, a proxy and a set of attributes of the process service are registered with the Jini look up service for a specific period of time. In one example, the length of time the process service is registered with the Jini look up service is configured to be substantially equal to the amount of time necessary to execute the job. In a different example, the process service is registered with the Jini look up service until the execution of the job has concluded. That is, the process service lease with the Jini look up service is renewed repeatedly as long as the job is being executed. Once the process service is registered with the Jini look up service, the process service proxy is downloaded by the system controller, initiating the communication between the system controller and the process service. Subsequently, in operation 510, the job is processed. In one exemplary embodiment, once the process service starts executing the job, the process service dispatches an event indicating the initiation of the job execution. In a different example, the process service dispatches informative events during the execution of the job and upon finishing the job execution.

Moving to operation 512, the process service completes processing the job. In one example, an event is dispatched upon the completion of processing the job. Once processing the job is completed, in one implementation, the process service proxy and the set of process service attributes are removed from the Jini look up service, indicating the availability of the process resource to execute a different job having substantially the same requirements.

In operation 514, a determination is made as to whether the processing resource is to be maintained available. If it is determined that the processing resource should be maintained available for processing additional jobs, the method continues to operation 504 in which the respective leases of the machine service proxy and set of machine service attributes with the Jini look up service are renewed for a specific period of time. However, if it is determined that maintaining the availability of the processing resource is not necessary, the method ends. Thus, in this manner, beneficially, unused resources of a processing resource such as a computer system connected to a network of ad-hoc computer systems can be implemented to execute a process having requirements substantially similar to computer system attributes, without solely dedicating the computing resources of the processing resource to executing jobs associated with the DPF system.

Figure 13:
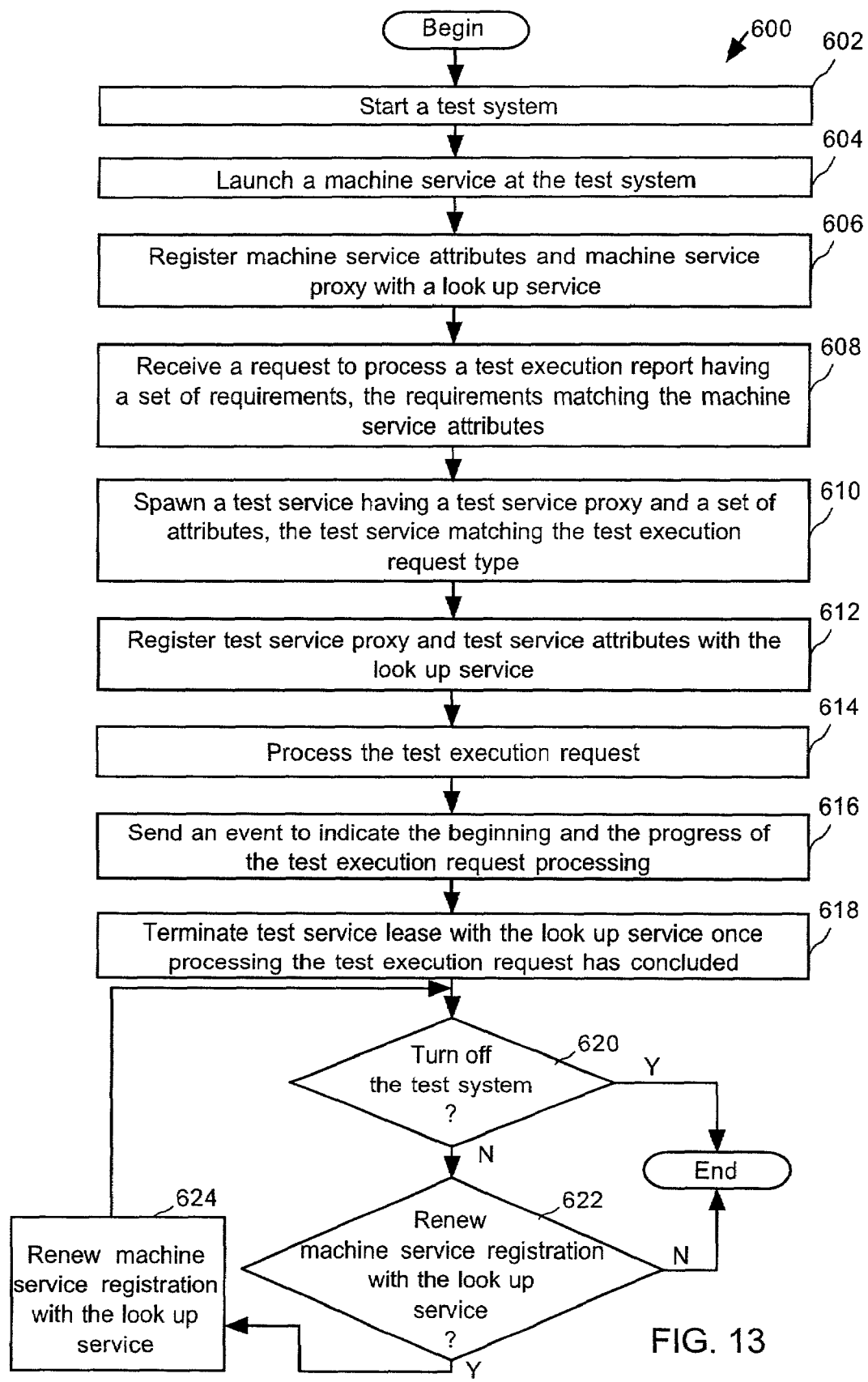
FIG. 13 is a flow chart diagram of a method operations in implementing a test system to execute a test execution request in a distributed test framework (DTF) system, in accordance with still another embodiment of the present invention.

Implementing a test system of the present invention to execute a test execution request in a distributed test framework (DTF) system can further be understood with respect to a flow chart diagram 600 of method operations depicted in FIG. 13, in accordance with one embodiment of the present invention. The method begins in operation 602 in which a test system is started following by launching a machine service at the test system in operation 604. In one example, a launch manger is implemented to launch the test system machine service by calling the runMachineService.ksh method having two arguments as shown in Table 2.

TABLE 2

Exemplary Code for Running Machine Service

| | | |
|---|---|---|
| 1 | In one example, this is a Java Home for the machine service. | Example:<br>Y:/jdk1.3/win32<br>When mapped Solaris(y:) has Win32 JDK installed.<br>Example:<br>C:/jdk1.3/win32<br>When the local machine has JDK installed. |
| 2 | In one embodiment, this is the name of a host on which the lookup service is running. | example:<br>longpier |

An exemplary method is:

sh runMachineService.ksh c:/jdk1.3 longpier.

As designed, in one implementation, a Jini look up service is run prior to launching the machine service. However, prior to launching the machine service, as shown below and depending on the environment, a plurality of variables are required to be set:

Implement a "setjini.csh" method in a Solaris environment;

Use a "setjini-linux.csh" method in a Linux environment;

In a Solaris X86 environment, the method "setjini-X86.csh" is implemented; and

Use a "setjini.bat" method in a Win32 environment.

For instance, where in one example the DTF system is named "KNigHT," in a Win32 machine, a "Y:" drive is required to be mapped to a workspace of KNigHT. Specifically, this is achieved by using a "Map Network Drive" feature of the Windows Explorer and to map the drive "Y:" to a proper place in the network file system. Table 3 provides a sample script for setting a machine service, in accordance to one embodiment of the present invention.

TABLE 3

Sample Script for Setting a Machine Service

```
unsetenv CLASSPATH
    unsetenv JAVA_HOME
    unsetenv SWING_HOME
    setenv WORKSPACE/net/sqesvr/export/automation/KNIGHT-
TESTING/
    setenv JINIDIR/net/sqesvr/export/automation/JINI/JINI1_1
    setenv JAXP_DIR $WORKSPACE/jaxp1.0
    setenv JAVA_HOME
    /net/sqesvr/export/automation/JDK/jdk1.3/solaris
    set JJ=$JINIDIR/lib
    set JINI_JARS=$JJ/JINI-core.jar:$JJ/JINI-
    ext.jar:$JJ/reggie.jar:$JJ/reggie-dl.jar:$JJ/sun-util.jar:$JJ/tools.jar
    set XML_JARS=$JAXP_DIR/jaxp.jar:$JAXP_DIR/parser.jar
    set KNIGHT_JARS=$ WORKSPACE/agent.jar:$WORKSPACE/
    controller.jar
    setenv CLASSPATH
    $JINI_JARS:$XML_JARS:$KNIGHT_JARS:.
    setenv PATH $JAVA_HOME/bin:$PATH
```

Subsequent to setting the surrounding environment, as shown in the below exemplary embodiments, the machine service is run implementing a platform dependent method. For instance:

In a Solaris environment, a "runMachineService.csh" method is implemented to run the machine service;

A "runMachineServie.bat" method is used to run the machine service in a Win32 environment;

A "runMachineServicelinux.csh" method is used to run the machine service in Linux environment; and In Solaris X86, a "runMachineServiceX86.csh" method is implemented to run the machine service.

In one instance, the script provided in Table 4 is implemented to run the machine service.

TABLE 4

Sample Script to Run a Machine Service

```
setenv JINIDIR/net/sqesvr/export/automation/JINI/JINI1_1
rmid -J-Djava.security.policy=$JINIDIR/example/lookup/policy.all \
    -log/net/sqesvr/export/automation/KNIGHT-
TESTING/workspace-062900/agent-log1 &
java -Djava.security.policy=$JINIDIR/example/lookup/policy.all \
    -Djava.rmi.server.codebase=http://<machinename>/ \
    knight.agent.MachineService \
    JINI://<machinename>/
```

By way of example, in the sample script shown above in Table 4, the <machinename> is the name of the system running the look up service. During the initial running of the machine service, a GUI is configured to appear requesting the manual entry of the test system properties. Following the manual entry of the required properties and saving same, the "attribute.properties" file of the test system directory can be modified so as to change the "gui=on" field to "gui=off," thus eliminating the necessity to input same data for each cycle.

With continued reference to FIG. 13, in operation 606, the machine service attributes and the machine service proxy are registered with the look up service. As discussed in more detail above, in one example, the look up service is configured to be a Jini look up service.

In one exemplary embodiment, an AttributeManager is implemented to register the machine service attributes with the look up service. As designed, an AttributeManager includes an Attribute Package having a plurality of attribute entry classes. In one instance, the Attribute Package includes approximately about 30 attribute entry classes. However, in a different implementation, the Attribute Package may include any appropriate number of attribute entry classes. A plurality of attribute entry classes are provided below in Table 5.

TABLE 5

Sample Test System Attribute List

| No. | Property Name | Source | Auto Detectable | JINI Lookup Service Registerable | Description |
|---|---|---|---|---|---|
| | | Hardware Entry | | | |
| 1 | hardware.video.depth | Toolkit class | yes | yes | Color depth |
| 2 | hardware.video.dpi | Toolkit class | yes | yes | Screen resolution |
| 3 | hardware.video.screen.width | Toolkit class | yes | yes | Screen size |
| 4 | hardware.video.screen.height | Toolkit class | yes | yes | Screen size |
| 5 | hardware.video.vendor | Manual | no | yes | |
| 6 | hardware.video.bustype | Manual | no | yes | AGP1.0, AGP2.0, PCI2.1, ISA, SUN PCI |
| 7 | hardware.sound.vendor | Manual | no | yes | |
| 8 | hardware.sound.bustype | Manual | no | yes | PCI2.1, ISA, SUN PCI |
| 9 | hardware.sound.wasinstalled | Manual | no | yes | |
| 10 | hardware.memory.size | Manual | no | yes | Physical memory size in Mbytes |
| 11 | hardware.cpu.speed | Manual | no | yes | Clock speed in Mhz. |
| 12 | hardware.cpu.type | Manual | no | yes | Pentium 3, Sparc |
| | | Software Entry - operating system information | | | |
| 13 | software.os.name | System class | yes | yes | Operating system name |
| 14 | software.os.arch | System class | yes | yes | Operating system architecture |
| 15 | software.os.version | System class | yes | yes | Operating system version |
| | | Software Entry - java information | | | |
| 16 | software.java.version | System class | yes | | Java Runtime Environment version |
| 17 | software.java.vendor | System class | yes | | Java Runtime Environment vendor |
| 18 | software.java.vendor.url | System class | yes | | Java vendor URL |
| 19 | software.java.home | System class | yes | | Java installation directory |
| 20 | software.java.vm.specification.version | System class | yes | | Java Virtual Machine specification version |
| 21 | software.java.vm.specification.vendor | System class | yes | | Java Virtual Machine specification vendor |
| 22 | software.java.vm.specification.name | System class | yes | | Java Virtual Machine specification name |
| 23 | software.java.vm.version | System class | yes | | Java Virtual Machine implementation version |

TABLE 5-continued

Sample Test System Attribute List

| No. | Property Name | Source | Auto Detectable | JINI Lookup Service Registerable | Description |
|---|---|---|---|---|---|
| 24 | software.java.vm.vendor | System class | yes | | Java Virtual Machine implementation vendor |
| 25 | software.java.vm.name | System class | yes | | Java Virtual Machine implementation name |
| 26 | software.java.specification.version | System class | yes | | Java Runtime Environment specification version |
| 27 | software.java.specification.vendor | System class | yes | | Java Runtime Environment specification vendor |
| 28 | software.java.specification.name | System class | yes | | Java Runtime Environment specification name |
| 29 | software.java.class.version | System class | yes | | Java class format version number |
| 30 | software.java.class.path | System class | yes | | Java class path |
| | Software Entry - javatest harness information | | | | |
| 31 | software.javatest.wasinstalled | Manual | no | yes | yes or no |
| 32 | software.javatest.version | Manual | no | yes | Installed JavaTest version |
| 33 | software.javatest.home | Manual | no | | JavaTest installation directory |
| | Software Entry - tonga harness information | | | | |
| 34 | software.tonga.wasinstalled | Manual | no | yes | yes or no |
| 35 | software.tonga.version | Manual | no | yes | Installed Tonga version |
| 36 | software.tonga.home | Manual | no | | Tonga installation directory |
| | Software Entry - mks toolkit information | | | | |
| 37 | software.mks.wasinstalled | Manual | no | yes | yes or no |
| 38 | software.mks.version | Manual | no | yes | Installed MKS version |
| 39 | software.mks.home | Manual | no | | MKS installation directory |
| | Network Entry | | | | |
| 40 | network.name | Inet Address | yes | yes | host machine name |
| 41 | network.address | Inet Address | yes | yes | host machine address |
| | I18n Entry | | | | |
| 42 | i18n.locale | Locale class | yes | yes | host default locale |
| 43 | i18n.timezone | Time Zone | yes | yes | host default timezone id |

TABLE 5-continued

Sample Test System Attribute List

| No. | Property Name | Source | Auto Detectable | JINI Lookup Service Registerable | Description |
|---|---|---|---|---|---|
| | | Misc Entry | | | |
| 44 | misc.file.separator | System class | yes | | File separator ("/" on UNIX) |
| 45 | misc.path.separator | System class | yes | | Path separator (":" on UNIX) |
| 46 | misc.line.separator | System class | yes | | Line separator ("\n" on UNIX) |
| 47 | misc.user.name | System class | yes | | User's account name |
| 48 | misc.user.home | System class | yes | | User's home directory |
| 49 | misc.user.dir | System class | yes | | User's current working directory |
| 50 | misc.stablejava.home | Manual | no | | Stable java for launching a harness itself |
| 51 | misc.testservice.type | Manual | no | yes | Runtime info on Jck, Jtreg, Tonga, and Shell test Services was added. |
| 52 | misc.service.type | Through method name called | yes | yes | In one example, this attribute reveals whether a machine service or test service are automatically set when getEntriesFor Machine Service() method is called. |

In one exemplary embodiment, the AttributeManager is almost the only object used to provide an interface between the machine service and the other components of the DTF system. However, in a different implementation, any suitable mechanism may be used to provide communication between the machine service and the other components of the DTF system.

Once the AttributeManager instanciates, the machine service attributes which values are obtainable during the run time are attained. Then, an exemplary dialog box is provided allowing manual entry of additional attributes and the modification of such manually entered entries. Next, an Attribute.Properties file is created so as to save the automatically identified and manually entered attributes.

As designed, in one embodiment, the machine service AttributeManager is configured to include a first machine service interface, an example of which is shown below in Table 6.

TABLE 6

Jini Machine Service Interface public Entry[] getEntriesForMachineService();
public Properties getProperties();

The resulting Entry Array is implemented by the machine service to register the registerable attributes (both, the manual and automatic) of the test system with the Jini look up service so as to promote the machine service availability to execute a process. As shown in Table 7, in one instance, a Joinmanager class is implemented to register the machine service with the Jini look up service.

TABLE 7

Implementing Joinmgr to Register with Jini Look up Service

AttributeManager am = new AttributeManager();
joinMgr = new JoinManager(proxy, am.getEntriesForMachineService(), callback, leaseMgr);

A second machine service interface is used to export nearly all the manually and automatically obtained attributes of the test system. In one embodiment, an AgentService component of the test system is configured to provide a remote method to deliver the resulting array to a TestController component of the system controller. A different exemplary interface between the AttributeManager and the Jini machine service is provide below in Table 8.

TABLE 8

Exemplary Interface between the Machine Service and the Jini Look Up Service public static Entry[] getEntriesForServiceTemplate(Hashtable table);
public static Entry createEntry(String key, String value);

In one exemplary implementation, the machine service is configured to include a MachineService class and a MachineServiceProxy class. The MachineService class is designed to renew the machine service leases with the Jini look up service, obtain the test system attributes, and register machine service with the Jini look up service using the machine service attributes and machine service proxy. The MachineServiceProxy class is configured to be the communication channel between the system controller and the test system.

With a continued reference to FIG. 13, in operation 608, the test system receives a request to process a test execution request. As designed, the test execution request has a plurality of requirements configured to substantially match the machine service attributes. For instance, in accordance to one embodiment, the TestController component of the system controller is configured to match an array of attribute template with the entries in the Jini look up service. In another implementation, a ServiceTemplate class is utilized to locate a machine service having substantially similar attributes. As an example, the methods provided in Table 9 can be implemented to search for a test system having Windows 98 and Javatest.

TABLE 9

Searching for a Test System having Windows 98 and Javatest

```
ServiceRegistrar reg = ...
Hashtable at = new Hashtable();
at.put("software.os.name", AttributeManager.WIN98);
at.put("software.javatest.wasinstalled", AttributeManager.YES);
ServiceTemplate st = new ServiceTemplate(id, types,
AttributeManager.getEntriesForServiceTemplate(at));
MachineService ms = (MachineService)reg.lookup(st);
```

In a different embodiment, the test system having Windows 98 and Javatest may be found implementing the method shown in Table 10.

TABLE 10

Searching for a Test System Having Windows 98 Javatest

```
Entry[] myEntry = new Entry[2];
MyEntry[0] = AttributeManager.createEntry("software.os.name",
AttributeManager.WIN98);
MyEntry[1] = AttributeManager.createEntry("software.javatest.
wasinstalled",
AttributeManager.YES);
ServiceTemplate st = new ServiceTemplate(id, types, myEntry);
```

Proceeding to operation 610, the machine service spawns a test service configured to have a test service proxy and a set of test service attributes. In accordance with one example, the test system type is configured to match the type of the test execution request. As shown below in Table 11, the embodiments of the present invention have been configured to include about four types of test service.

TABLE 11

Test Service Types

| Possible Test Service Type Entry Value | Meaning |
| --- | --- |
| AttributeManager.JCK_TEST | Jck type test |
| AttributeManager.JTREG_TEST | Jtreg type test |
| AttributeManager.TONGA_TEST | Tonga type test |
| AttributeManager.SHELL_TEST | Shell type test |

However, in a different embodiment, the embodiments of the present invention can be defined so as to include other test service types. For instance, the AttributeManager class includes a method "misc.testservice.type" entry configured to support new types of test system as the machine service is required to create a matching test system type.

Continuing to operation 612, the test service proxy and test service attributes are registered with the Jini look up service. In one example, the test service registers with the Jini look up service utilizing an array of entries resulting from the running of the method shown in Table 12.

TABLE 12

Array of Entries Implemented in Registering Test Sevice with the Look up Service public Entry[] getEntriesForTestService(String test_service_type);

In accordance with one implementation and as discussed in more detail below, the test service includes the following classes: TestTypeService, TestTypeServiceWithLeases, TestTypeServiceBackend, TongaServiceProxy, ShellServiceProxy, JtRegServiceProxy, and JCKServiceProxy. The generic code for each of the different test types have been defined separately in TestTypeService, TestTypeServiceWithLeases, and TestTypeServiceBackend classes. Additionally, the code for each test type is configured to include a separate corresponding proxy. For instance, the embodiments of the present invention include a TongaServiceProxy for Tonga test type and a ShellServiceProxy for a Shell test type. In addition to the above-mentioned classes, the test service further includes a BackendProtocol interface and a TestTypeServiceInterface interface.

TestTypeService:

The TestTypeService class contains the implementations performing the look up service discovery, creating of the proxy corresponding to the test type, and registering the test service and the test system attributes obtained from the AttributeManager with the look up service. In one example, the TestTypeService class uses an inner Listener class configured to implement the DiscoveryListener interface to discover a plurality of look up services and register with same. For instance, the TestTypeService creates a LookupDiscovery object and uses the LookupDiscovery object to register the Listener with the discovery adapter of Jini so as to be capable of listening to substantially all the messages being broadcast by newly launched look up services.

In accordance with one example, each test type service shares substantially all the code common between TestType-Service, TestTypeSErviceWithLeases and TestTypeService-Backend classes. Additionally, the test type proxies are configured to run a plurality of methods such as running the test suites, killing the test suites, and checking the status of the test suites.

TestTypeServiceInterface:

The TestTypeServiceInterface is configured to provide an interface for communication between the system controller and the test service agent. In one exemplary embodiment, the TestTypeServiceInterface is implemented by a plurality of Proxy classes. For instance, the embodiments of the present invention include a separate proxy class (i.e., TongaServiceProxy) to provide an interface for running and managing Tonga test suites. In a similar manner, the TestServiceInterface is configured to be implemented by the Proxys of shell, Jtreg, and JCK test types.

In accordance to one embodiment, the TestTypeService-Interface is designed to provide interface for the following methods:

runTestSuite: This method is configured to run the test suite.

KillTestSuite: This method terminates the execution of the test suite being run.

TestSuiteStatus: This method updates the status of the test suite being run.

It must be noted that in a different embodiment, if necessary, additional interfaces can be implemented so as to run different commands.

BackendProtocol:

The BackendProtocol is an interface configured to define the remote communication protocols between the proxy and the backend. In one example, the backend is defined as a RMI activable back-end configured to provide RMID and RMI activation framework. For instance, the BackendProtocol provides interfaces for the following methods:

Firing off the test suites using the backend;

Stopping the execution of the test suites; and

Checking the status of the test suites.

TestTypeServiceWithLeases:

TestTypeServiceWithLeases is an extension of the TestTypeService and is configured to provide the TestType-Service with leasing capability. For instance, by implementing the TestTypeServiceWithLeases the TestTypeService is able to perform the following tasks:

Renewing a test service lease with the look up service;

Terminating the test service lease with the look up service; and

Awakening a lease thread between the test system and the look up service when the TestTypeService proxy is registered with the look up service.

In one instance, the lease function is carried out implementing a specific leaseThread.

TestTypeServiceBackend:

The TestTypeServiceBackend is an extension of the TestTypeService, which uses RMI to communicate with an activable backend process. In one example, the TestType-ServiceBackend is extended from the TestTypeServiceWith-Leases and is configured to have a nested Backend class implementing the BackendProtocol. As designed, the Backend class is configured to implement substantially all the methods contained within the BackendProtocol. In one example, the BackendProtocol methods are fireTests and endTestSuite. In one embodiment, the TestTypeService-Backend includes additional methods to spawn a separate virtual machine to run the test suite and to direct the result of the execution of the test suite to a log file.

TongaServiceProxy:

The TongaServiceProxy class implements the TestServiceInterface and is configured to function as a mechanism, which provides communication between the system controller and the TestTypeService. In one example, the TongaServiceProxy class includes the RunTestSuite, killTestSuite, and testSuiteStatus methods. As designed, the implementation of these methods to include code configured to be used specifically for running Tonga test suites.

With a continued reference to FIG. 13, in operation 614, the test execution request is processed. Then, an event is sent to indicate the beginning and the progress of the test execution request processing. Next, in operation 618, once the processing of the test execution request has concluded, the test service lease with the look up service is terminated. In this manner, the non-existence of the test service proxy and test service attributes in the Jini look up service serves as an indication of the availability of the test system to process a test execution request having similar requirements.

Proceeding to operation 620, a determination is made as to whether the test system has been turned off. If the test system has been turned off, in one embodiment, the method ends. Alternatively, if it is determined that the test system is still on, in the operation 622, a determination is made as to whether the machine service registration with the look up service needs to be renewed. If it is determined that the renewal of the machine service proxy is not required, in one example, the method is done. However, if it is decided to renew the machine service registration with the look up service, the method proceeds to operation 620.

Figure 14:
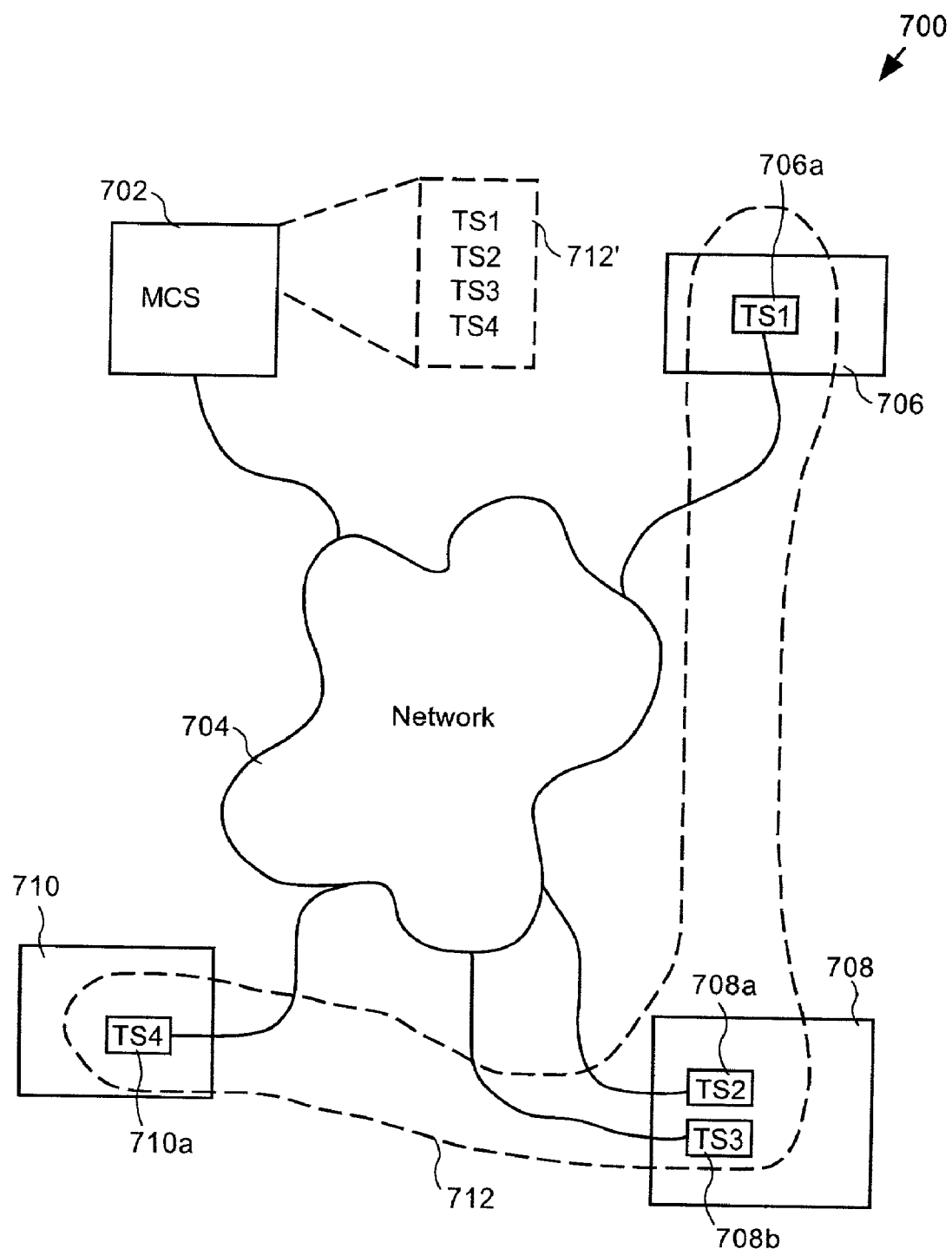
FIG. 14 is a block diagram of distributing the execution of a test suite between a community of ad-hoc network of processing resources, in accordance with yet another embodiment of the present invention.

Referring now to a block diagram 700 of FIG. 14, distributing the execution of a test suite between a community of ad-hoc network of processing resources can further be understood, in accordance with one embodiment of the present invention. As shown, a plurality of test systems 706a, 708a, 708b, and 710a are connected to a master computer system 702 through a network 704. As discussed in more detail above, in one example, the master computer system 702 includes a look up service (registry service) and a system controller. As shown, the plurality of processing resources, i.e., test systems 706a, 708a, 708b, and 710a, form a group of test systems 712. As shown, the group of the test systems 712 correspond to the plurality of registered test systems 712' with the look up service component of the master computer system 702. In accordance to one embodiment of the present invention, the system resources (e.g., the test systems) of the present invention are system resources defined in different locations and not solely dedicated to execute test execution requests. As specifically depicted in the exemplary embodiment of FIG. 14, the test system 706a is defined in location 706, the test systems 708a and 708b are defined in location 708, and the test system 710a is defined in location 710, as they collectively define the test system group 712. In one implementation, the system resources of the present invention are configured to be turned on by a central processing center while in a different example, the system resources may be turned on separately using different systems (e.g., a web page acting as the system controller, etc.).

As a result, beneficially, the test systems of the present invention can dynamically join and detach the ad-hoc group of networked test systems configured to process a test execution request irrespective of the test system location. Additionally, the untapped resources of the test systems of the present invention can be used to process the test execution request irrespective of the main purpose of the system resource.

Thus, in one envisioned embodiment, a plurality of processing resources (e.g., computer systems) connected through an intranet of a company, having different hardware/software configurations and platforms and defined in the same or different buildings or campuses can be coupled to a system running the registry service and the controller code. In this manner, the untapped resources of the plurality of registered processing resources can be accessed during day or night to execute a job without allocating each of the processing resources to process execution, solely. Consequently, the unused resources of each of the plurality of processing resources can execute subparts of a job, in parallel, thus significantly reducing the overall execution time of the job to mere seconds or hours, which typically may take days, weeks, or months.

The advantages of the present invention are numerous. Most notably, the present invention implements an ad-hoc network of processing resources having different hardware/software configurations to execute a process wherein the attaching and detaching of a processing resource has substantially minimum or no effect on the process execution. Furthermore, the processing resources of the present invention are not solely limited to be used by the distributed process framework system. As such, the processing resources of the present invention substantially eliminate the waste of resources associated with the prior art. Another advantage of the processing resources of the present invention is that in contrast to the prior art, the processing resources of the present invention provide a highly scalable distributed process framework system. Yet another benefit of the present invention is that the processing resources of the present invention provide a DPF system requiring substantially minimal/none administration. Still another benefit of the present invention is that the ad-hoc network of distributed processing resources in conjunction with the server component creates a self-healing network. Yet another benefit of the present invention is that the network of processing resources can in fact span over a large geographical area.

Although the present invention mainly describes exemplary embodiments of a distributed test framework system design to execute a test suite, it must be understood by one having ordinary skill in the art that the distributed process framework of the present invention can be implemented to run any computer process. Additionally, although in one example the DTF and/or the DPF systems are called "KNigHT," in a different embodiment, the DTF and/or DPF systems can be called any arbitrary name. Furthermore, although the present invention is described based on the Jini technology, other network technologies having the capability to create an ad-hoc group of computer resources may be implemented (e.g., RMI, Transport Commit Protocol/Internet Protocol (TCP/IP) Sockets, etc.). Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A processing resource configured to be executed on a computing device, comprising:
    a machine service component having a machine service proxy and a set of machine service attributes, the machine service component being configured to implement the machine service proxy and the set of machine service attributes to register the processing resource with a registry service so as to advertise an availability of the processing resource to execute a process;
    a process service component spawned by the machine service component upon the machine service component receipt of a request to execute the process from a system controller,
    wherein the system controller is configured to implement the machine service proxy to communicate with the processing resource and the process service component is configured to have a process service proxy and a set of process service attributes, the process service component being configured to implement the process service proxy and the set of process service attributes to register with the registry service, such that the process service component is registered with the registry service for a length of time necessary to execute the process and a lack of the process service proxy and a set of process service attributes in the registry service is configured to indicate the availability of the processing resource to execute the process having a similar type.

2. A processing resource as recited in claim 1, wherein the process service component is configured to have a type similar to a type of the process.

3. A process as recited in claim 1, wherein the process service proxy and the set of process service attributes are removed from the registry service upon a conclusion of an execution of the process.

4. A processing resource as recited in claim 1, wherein the registry service is a look up service.

5. A processing resource as recited in claim 1, wherein the process is a test execution request.

6. A computer implemented method for executing a process by a processing resource, the method comprising:
    enabling the processing resource;
    registering a machine service of the processing resource so as to advertise an availability of the processing resource to execute a job;
    receiving a request to execute the job on the processing resource;
    launching a process service by the machine service of the processing resource, the process service configured to execute the job;

executing the job; and completing the execution of the job, and launching the process service by the machine service of the processing resource includes,
- (i) spawning of the process service having a type by the machine service, the process service configured to have a process service proxy and a set of process service attributes; and
- (ii) registering the process service proxy and the set of proxy service attributes with a registry service, wherein the type of the process service is configured to be similar to a type of the job, and completing the execution of the job includes, removing of a process service proxy and a set of process service attributes of the process service from a registry service, the removing being configured to indicate an eligibility of the processing resource to execute the job having a similar type.

7. A computer implemented method as recited in claim 6, wherein enabling the processing resource includes one of turning on the processing resource and dispatching of a signal indicating the availability of the processing resource to execute the job.

8. A computer implemented method as recited in claim 6, wherein registering the machine service of the processing resource so as to advertise the availability of the processing resource to execute the job using the machine service of the processing resource includes, registering a machine service proxy and a set of machine service attributes of the machine service of the processing resource with a registry service.

9. A computer implemented method as recited in claim 6, wherein receiving the request to execute the job on the processing resource includes, downloading of a machine service proxy of the machine service of the processing resource by a system controller; and implementing the machine service proxy of the machine service of the processing resource by the system controller to dispatch the request to execute the job.

10. A computer implemented method as recited in claim 6, wherein the process service is registered with the registry service for a length of time required to execute the job.

11. A computer implemented process execution method, the method comprising:

starting a processing resource;

launching a machine service on the processing resource;

registering a machine service proxy and a set of machine service attributes with a registry service;

receiving a request to execute a process having a set of requirements configured to match the set of machine service attributes;

spawning a process service having a process service proxy and a set of process service attributes, the process service having a type matching a type of the process;

registering the process service proxy and the set of process service attributes with the registry service;

executing the process;

sending an event indicating a beginning of the execution of the process; and terminating a process service lease with the registry service upon a conclusion of executing the process.

12. A computer implemented process execution method as recited in claim 11, further including, renewing a machine service lease with the registry service if requested.

13. A computer implemented process execution method as recited in claim 11, wherein the registry service is a look up service.

14. A computer implemented process execution method as recited in claim 11, wherein the processing resource is a test system.

15. A computer implemented process execution method as recited in claim 11, wherein the process is a test execution request.

16. A processing resource configured to be executed on a computing device, comprising:

a machine service component having a machine service proxy and a set of machine service attributes, the machine service component being configured to implement the machine service proxy and the set of machine service attributes to register the processing resource with a registry service so as to advertise an availability of the processing resource to execute a process; and a process service component spawned by the machine service upon receiving of a request to execute a process from the system controller by the machine service component, the process service component configured to include a process service proxy and a set of process service attributes, the process service component configured to implement the process service proxy and the set of process service attributes to register with the registry service, wherein a system controller is configured to implement the machine service proxy to communicate with the processing resource and a lack of the process service proxy and the set of process service attributes in the registry service is configured to indicate the availability of the processing resource to execute the process having a similar type.

* * * * *